(12) United States Patent
Sawaguchi et al.

(10) Patent No.: US 11,487,480 B2
(45) Date of Patent: Nov. 1, 2022

(54) METHOD OF DISPLAYING PRESET INFORMATION AND INFORMATION PROCESSING APPARATUS

(71) Applicant: Oki Data Corporation, Tokyo (JP)

(72) Inventors: Kenji Sawaguchi, Tokyo (JP); Hitomi Sakai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/997,681

(22) Filed: Aug. 19, 2020

(65) Prior Publication Data

US 2021/0089244 A1 Mar. 25, 2021

(30) Foreign Application Priority Data

Sep. 20, 2019 (JP) .............................. JP2019-171805

(51) Int. Cl.
*G06F 3/12* (2006.01)

(52) U.S. Cl.
CPC .......... *G06F 3/1204* (2013.01); *G06F 3/1205* (2013.01); *G06F 3/1253* (2013.01)

(58) Field of Classification Search
CPC combination set(s) only.
See application file for complete search history.

(56) References Cited

U.S. PATENT DOCUMENTS

| 2011/0255115 | A1* | 10/2011 | Tokuda | G06F 3/1257 358/1.13 |
| 2014/0092405 | A1* | 4/2014 | Park | G06F 3/1253 358/1.11 |
| 2015/0254024 | A1* | 9/2015 | Fruin | G06F 3/1204 358/1.15 |
| 2015/0371118 | A1* | 12/2015 | Lin | G06F 3/1285 358/1.15 |
| 2019/0303076 | A1* | 10/2019 | Kato | G06F 3/1253 |
| 2020/0125301 | A1* | 4/2020 | Kaneda | G06F 3/1285 |

FOREIGN PATENT DOCUMENTS

JP 2018-36721 A 3/2018

* cited by examiner

*Primary Examiner* — Helen Zong
(74) *Attorney, Agent, or Firm* — Metrolex IP Law Group, PLLC

(57) ABSTRACT

A method of displaying preset information according to an embodiment may include: storing plural pieces of preset information including first preset information and second preset information; obtaining, from a target file that is to be processed and includes first association information associated with the first preset information, the first association information; and displaying one or more pieces of preset information out of the plural pieces of preset information that are stored, while preferentially displaying, based on the obtained first association information, the first preset information associated with the first association information with respect to the second preset information.

20 Claims, 29 Drawing Sheets

FIG. 3

| SETTING ITEM | SETTING VALUE |
|---|---|
| PAPER SIZE | A4 ← DSA |
| PAPER SOURCE | AUTO |
| LAYOUT | NORMAL |
| BORDER | SOLID LINE |
| COPIES | 1 |
| COLOR/ MONOCHROME | MONOCHROME |

FIG. 14

| Item | Change | Setting Value |
|---|---|---|
| Paper Size | Permit | A4 |
| Paper Source | Not permit | Multipurpose Tray |
| Layout | Not permit | 2 on 1 |
| Border | Not permit | None |
| Copies | Permit | 1 |
| Color/Mono | Not permit | Color |

Driver Setting Registration

OK  Cancel

FIG. 17

| SETTING ITEM | | CONTROL INFORMATION |
|---|---|---|
| Use only for this file | | Only for this file |
| Use with setting changeable | | Changeable |
| Paper Size | A4 | Change is not permitted |
| Paper Source | Multipurpose Tray | Change is not permitted |
| Layout | 2 on 1 | Change is not permitted |
| Border | None | Change is not permitted |
| Copies | 1 | Change is permitted |
| Color/Mono | Color | Change is not permitted |

DSR0     DSR     CI

DF

METHOD OF DISPLAYING PRESET INFORMATION AND INFORMATION PROCESSING APPARATUS

CROSS REFERENCE TO RELATED APPLICATIONS

This application claims priority based on 35 USC 119 from prior Japanese Patent Application No. 2019-171805 field on Sep. 20, 2019, entitled "METHOD OF DISPLAYING PRESET INFORMATION AND INFORMATION PROCESSING APPARATUS", the entire contents of which are incorporated herein by reference.

BACKGROUND

The disclosure relates to a method of displaying preset information in a printer driver and an information processing apparatus that uses the display method.

In a related art, a printer driver creates print data based on selected one of preset information each including setting values of various print setting items (for example, Patent Document 1).

Patent Document 1: Japanese Patent Application Publication No. 2018-036721

SUMMARY

A further improvement of user convenience in the print setting in the printer driver may be expected.

An object of an aspect of an embodiment may be to provide a method of displaying preset information and an information processing apparatus capable of improving user convenience.

An aspect of the disclosure may be a method of displaying preset information. The method may include: storing plural pieces of preset information including first preset information and second preset information; obtaining, from a target file that is to be processed and includes first association information associated with the first preset information, the first association information; and displaying one or more pieces of preset information out of the plural pieces of preset information that are stored, while preferentially displaying, based on the obtained first association information, the first preset information associated with the first association information over the second preset information.

An aspect of the disclosure may be an information processing apparatus. The information processing apparatus may include a storage part that stores therein plural pieces of preset information including first preset information and second preset information; an acquisition part that obtains, from a target file that is to be processed and includes first association information associated with the first preset information, the first association information; and a display controller that displays one or more pieces of preset information out of the stored plural pieces of preset information, while preferentially displaying, based on the first association information obtained by the acquisition part, the first preset information associated with the first association information over the second preset information.

According to at least one of the above aspects, user convenience can be improved.

BRIEF DESCRIPTION OF DRAWINGS

FIG. 3 is a diagram illustrating an explanatory view of an example of driver setting information such as being illustrated in FIG. 2.

FIG. 14 is a diagram illustrating a view of an example of a display screen of the printer driver such as being illustrated in FIG. 2.

FIG. 17 is a diagram illustrating an explanatory view of an example of a driver setting file such as being illustrated in FIG. 2.

DETAILED DESCRIPTION

Figure 1:
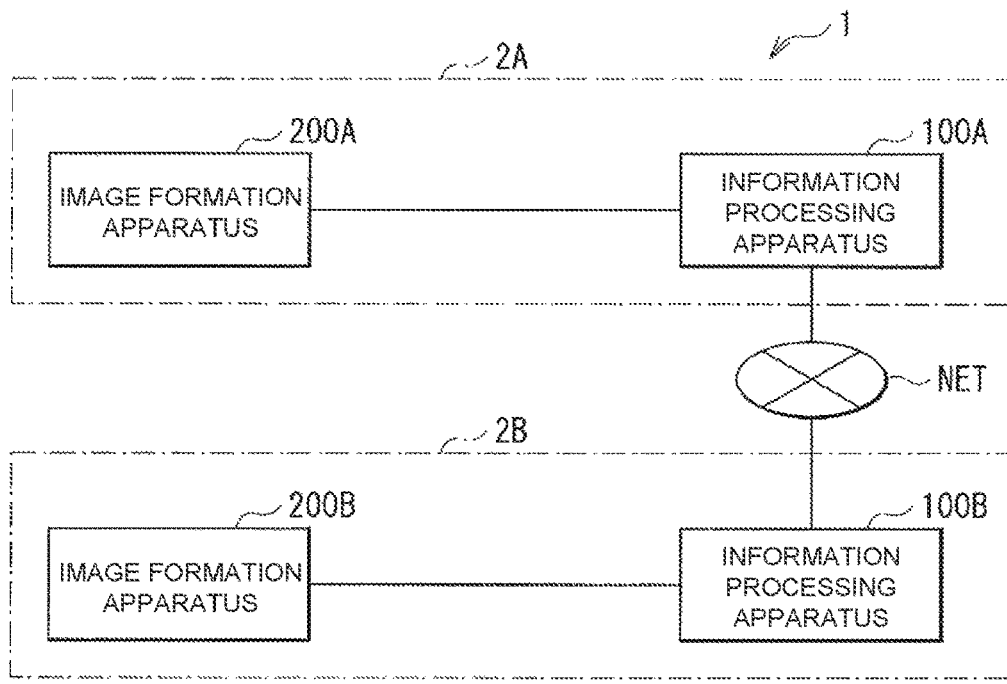
FIG. 1 is a diagram illustrating an explanatory view of a configuration example of an image formation system according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only. Note that descriptions are given in the following order.

1. First Embodiment
2. Second Embodiment

1. First Embodiment

Configuration Example

FIG. 1 illustrates an explanatory view of a configuration example of an image formation system 1 that employs a method of displaying preset information according to an embodiment. The image formation system 1 includes a system 2A and one or more systems 2B. In the image formation system 1, the system 2A communicates with the one or more systems 2B via a network NET such as the Internet, or the like.

The system 2A is configured to generate (create) a document file DOC which is data about advertisement design and distribute the document file DOC to the one or more systems 2B. The system 2A may be configured in a headquarter that manages stores where various products are sold, for example. The system 2A includes an information processing apparatus 100A and an image formation apparatus 200A. The information processing apparatus 100A and the image formation apparatus 200A communicate with each other via, for example, a wired LAN (local area network), a wireless LAN, a USB (universal serial bus), etc.

The information processing apparatus 100A may be a so-called personal computer, and is configured to execute various processes based on a user operation. For example, in the information processing apparatus 100A, application software 160 (described later) and a printer driver 170A (described later) are installed. Based on a user operation, the information processing apparatus 100A executes the application software 160 to create the document file DOC, which is the data for the advertisement design and store the document file DOC in association with driver setting information DSR. The driver setting information DSR is data including: driver setting information DSR0 including setting values of various print setting items to be used for printing of the document file DOC; and control information CI (described later) for performing display control in the information processing apparatus 100B. The information processing apparatus 100A executes, based on a user operation on the application software 160, the printer driver 170A, to create the print data based on the document file DOC and the driver setting information DSR0.

The image formation apparatus 200A is, for example, a printer. The image formation apparatus 200A is configured, based on the print data created by the information processing apparatus 100A, to perform an image formation operation using a developer such as toner or the like to form a monochrome or color image on a recording medium PM such as paper or the like.

Each system 2B is configured to use the driver setting information DSR and the document file DOC distributed from the system 2A. For example, the system 2B may be configured to be built in a store in which various products are sold. The system 2B includes the information processing apparatus 100B and an image formation apparatus 200B. The information processing apparatus 100B and the image formation apparatus 200B communicate with each other via, for example, a wired LAN (local area network), a wireless LAN, a USB (universal serial bus), etc.

The information processing apparatus 100B may be a so-called personal computer, and is configured to execute various processes based on a user operation. For example, in the information processing apparatus 100B, the application software 160 (described later) and a printer driver 170B (described later) are installed. The information processing apparatus 100B executes, based on a user operation, the application software 160, to open the document file DOC distributed from the system 2A. The information processing apparatus 100B executes, based on a user operation on the application software 160, the printer driver 170B, to create print data based on the document file DOC and the driver setting information DSR for the document file DOC.

The image formation apparatus 200B is, for example, a printer. The image formation apparatus 200B is configured, based on the print data created by the information processing apparatus 100B, to perform an image formation operation with a developer such as toner or the like to form a monochrome or color image on a recording medium PM such as paper or the like. A model of the image formation apparatus 200B may be the same as or different from that of the image formation apparatus 200A.

In this image formation system 1, based on a user operation in the system 2A, the information processing apparatus 100A executes the application software 160 to create the document file DOC and store the document file DOC and the driver setting information DSR to be used for printing of the document file DOC, which are associated with each other. The information processing apparatus 100A transmits the document file DOC and the driver setting information DSR to the system 2B. In the system 2B, the information processing apparatus 100B executes, based on a user operation, the application software 160 to open the document file DOC. The information processing apparatus 100B executes, based on a user operation on the application software 160, the printer driver 170B and registers the driver setting information DSR in the printer driver 170B. The information processing apparatus 100B also creates the print data based on the document file DOC and the driver setting information DSR for the document file DOC. Then, the image formation apparatus 200B executes the image formation operation based on the print data to from the image of the advertisement design on the recording medium PM. After that, if the user wants to reprint the document file DOC in the system 2B, the information processing apparatus 100B executes, based on a user operation, the application software 160 again to open the document file DOC. The information processing apparatus 100B executes, based on a user operation on the application software 160, the printer driver 170B to display a print setting screen SCP through which print setting is to be set. The information processing apparatus 100B creates, based on a user operation on the print setting screen SCP, a selection list LI1 indicating one or more pieces (options, candidates) of driver setting information and preferentially displays the driver setting information DSR among the one or more pieces (options, candidates) of driver setting information in the selection list LI1. When the information processing apparatus 100B selects, based on a user operation on the print setting screen SCP, the driver setting information DSR from the selection list LI1, the information processing apparatus 100B creates the print data based on the document file DOC and the driver setting information DSR. Then, the image formation apparatus 200B executes the image formation operation based on the print data, to form the image of the advertisement design on the recording medium PM. In this way, the image formation system 1 can improve the user convenience by preferentially displaying, in the selection list LI1, the driver setting information DSR, which is distributed along with the document file DOC.

(Information Processing Apparatus 100A)

Figure 2:
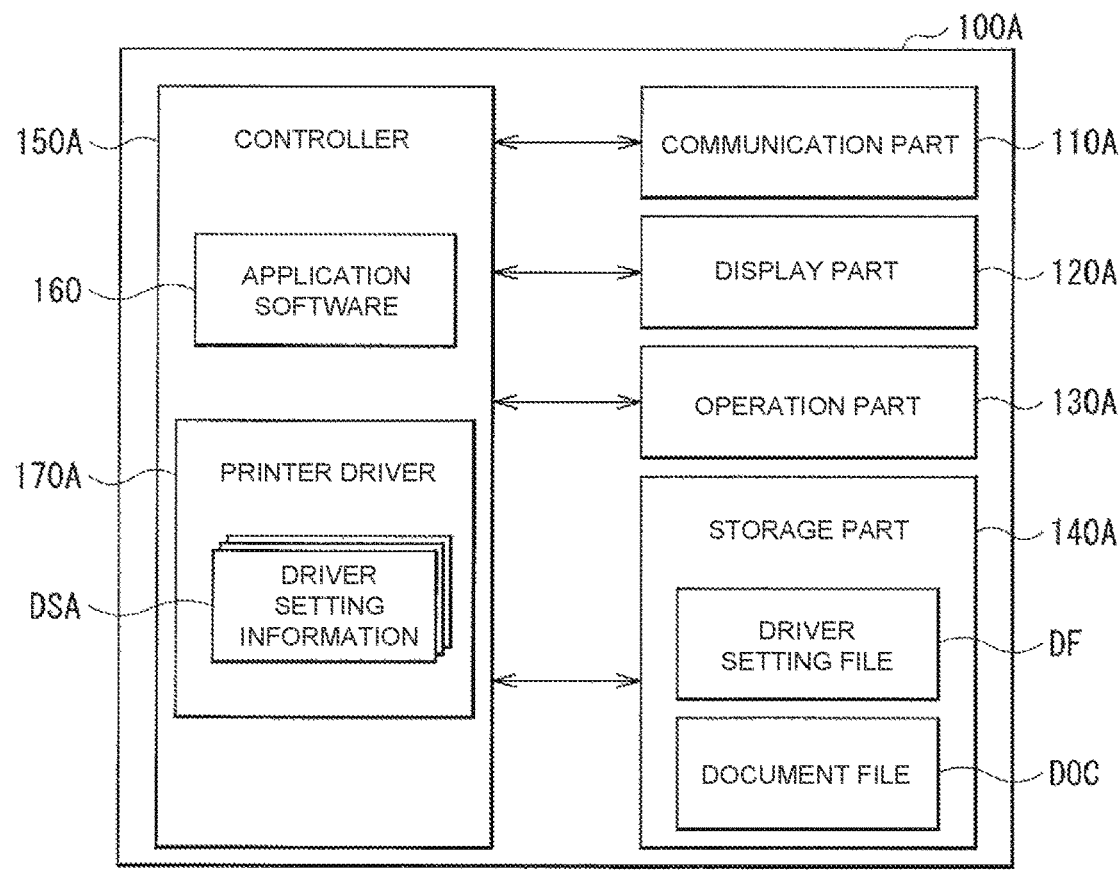
FIG. 2 is a block diagram illustrating a view of a configuration example of an information processing apparatus such as being illustrated in FIG. 1.

FIG. 2 illustrates a configuration example of the information processing apparatus 100A. the information processing apparatus 100A. The information processing apparatus 100A includes a communication part 110A (or a communication interface), a display part 120A (or a display), an operation part 130A (an input device, or a user interface), and a storage part 140A (storage, or a memory), and a controller 150A.

The communication part 110A is configured to communicate with the image formation apparatus 200A and the information processing apparatus 100B. For example, the communication part 110A transmits print data to the image formation apparatus 200A. The communication part 110A also transmits, to the information processing apparatus 100B of the system 2B, the document file DOC and a driver setting file DF including the driver setting information DSR to be used for printing of the document file DOC.

The display part 120A may be a liquid crystal display (LCD), for example, and is configured to display contents of processes performed by the controller 150A. For example, the display part 120A displays information indicating contents of processing of the application software 160 (described later), information indicating contents of processing of the printer driver 170A (described later), or the like.

The operation part 130A is configured to receive operations of a user. The operation part 130A may be configured using a keyboard, a mouse, and/or the like, for example.

The storage part 140A is configured to store therein various data including various programs, various settings, and/or the like. The storage part 140A may be configured to include a hard disk drive (HDD), a solid-state drive (SSD), and/or the like, for example. The storage part 140A stores therein the document file DOC and the driver setting file DF. The document file DOC is created by the application software 160 and stored in the storage part 140A. The driver setting file DF includes the driver setting information DSR. The driver setting file DF is exported (written) to the storage part 140A by the printer driver 170A (described later).

The controller 150A is configured to execute one or more of various programs, to perform operations based on the executed program(s). The controller 150A may be configured to include a processor that can execute programs, and a random-access memory (RAM), and the like, for example. The controller 150A can execute the application software 160, the printer driver 170A, and/or the like stored in the storage part 140A.

The application software 160 is a program to execute a specific process. For example, the application software 160 is configured to, based on a user operation, edit data regarding an advertisement design and stores the edit data as the document file DOC.

The printer driver 170A is a so-called device driver that controls operations in the image formation apparatus 200A, and is configured to create print data. The printer driver 170A may be stored in a computer-readable storage medium such as a CD-ROM (compact disc-read only memory) or the like, and is to be installed, based on a user operation, in the information processing apparatus 100A. Or the printer driver 170A may be downloaded, based on a user operation, through the network NET to the information processing apparatus 100A. In the printer driver 170A, plural pieces (options, candidates) of driver setting information DSA are registered. Each piece of driver setting information DSA registered in the printer driver 170A comprises data including setting values of the various print setting items. The printer driver 170A is configured to select, based on user's selection operations, one of the plural pieces of driver setting information DSA, and to execute, based on the selected piece of driver setting information DSA, setting of the various print setting items.

FIG. 3 illustrates an example of a piece of driver setting information DSA. For example, setting items in the piece of driver setting information DSA include items such as "Paper Size", "Paper Source", "Layout", "Border", "Copies", "Color/Monochrome", and the like. The item "Paper Size" is an item indicating the size of the recording media PM. The item "Paper Source" is an item indicating how to feed the recording media PM. The item "Layout" is an item indicating how to layout a page(s) on one sheet of the recording media PM and, for example, indicating how to arrange plural pages in the sheet in a case where plural-page data are to be printed in the sheet. The item "Border" is an item indicating a type of a frame border (a frame line) surrounding each page area in a case where plural-page data are to be printed in one sheet of recording media PM. The item "Copies" is an item indicating the number of copies of recording media PM to be printed. The item "Color/Monochrome" is an item indicating whether a color image is to be printed or a black and white image (monochrome image) is to be printed. In an example illustrated in FIG. 3, the setting values of "Paper Size", "Paper Source", "Layout", "Border", "Copies", and "Color/Monochrome" are set to "A4", "Auto", "Normal", "Solid line", "1", and "Monochrome", respectively. Each piece of driver setting information DSA is associated with the name thereof, which is a driver setting name (for example, "Standard Setting", etc.).

(Information Processing Apparatus 100B)

A configuration of the information processing apparatus 100B is the same as or similar to that of the information processing apparatus 100A (FIG. 2), and thus an illustration thereof is omitted in the drawings and descriptions thereof may be omitted to avoid redundancy. The information processing apparatus 100B includes a communication part 110B (or a communication interface), a display part 120B (or a display), an operation part 130B (an input device, or a user interface), and a storage part 140B (storage, or a memory), and a controller 150B.

The communication part 110B is configured to communicate with the image formation apparatus 200B and the information processing apparatus 100A. For example, the communication part 110B receives the document file DOC and the driver setting file DF transmitted from the information processing apparatus 100A of the system 2A. The communication part 110B also transmits print data to the image formation apparatus 200B.

Like the display part 120A, the display part 120B may be a liquid crystal display (LCD), for example, and is configured to display contents of processes performed or to be performed by the controller 150B.

Like the operation part 130A, the operation part 130B is configured to receive operations of a user.

Like the storage part 140A, the storage part 140B is configured to store therein various data including various programs, various settings, and/or the like. The storage part 140B stores therein the document file DOC and the driver setting file DF transmitted from the information processing apparatus 100A.

Like the controller 150A, the controller 150B is configured to execute one or more of various programs to perform operations based on the executed program(s). The controller 150B can execute the application software 160 and the printer driver 170B stored in the storage part 140B. In this example, the application software 160 in the information processing apparatus 100A is the same program as the application software 160 in the information processing apparatus 100B. Also, the printer driver 170A in the information processing apparatus 100A is the same program as the printer driver 170B in the information processing apparatus 100B.

Like the printer driver 170A, the printer driver 170B is a so-called device driver that controls operations in the image formation apparatus 200B, and is configured to create print data. In the printer driver 170B, plural pieces (plural options) of driver setting information DSB are registered. Like each piece of driver setting information DSA, each piece of driver setting information DSB comprises data including setting values of various print setting items. The printer driver 170B is configured to select, based on user's selection operations, one of the plural pieces (options) of driver setting information DSB, and to execute, based on the selected piece of driver setting information DSB, setting of the various print setting items.

(Software Configuration)

Figure 4:
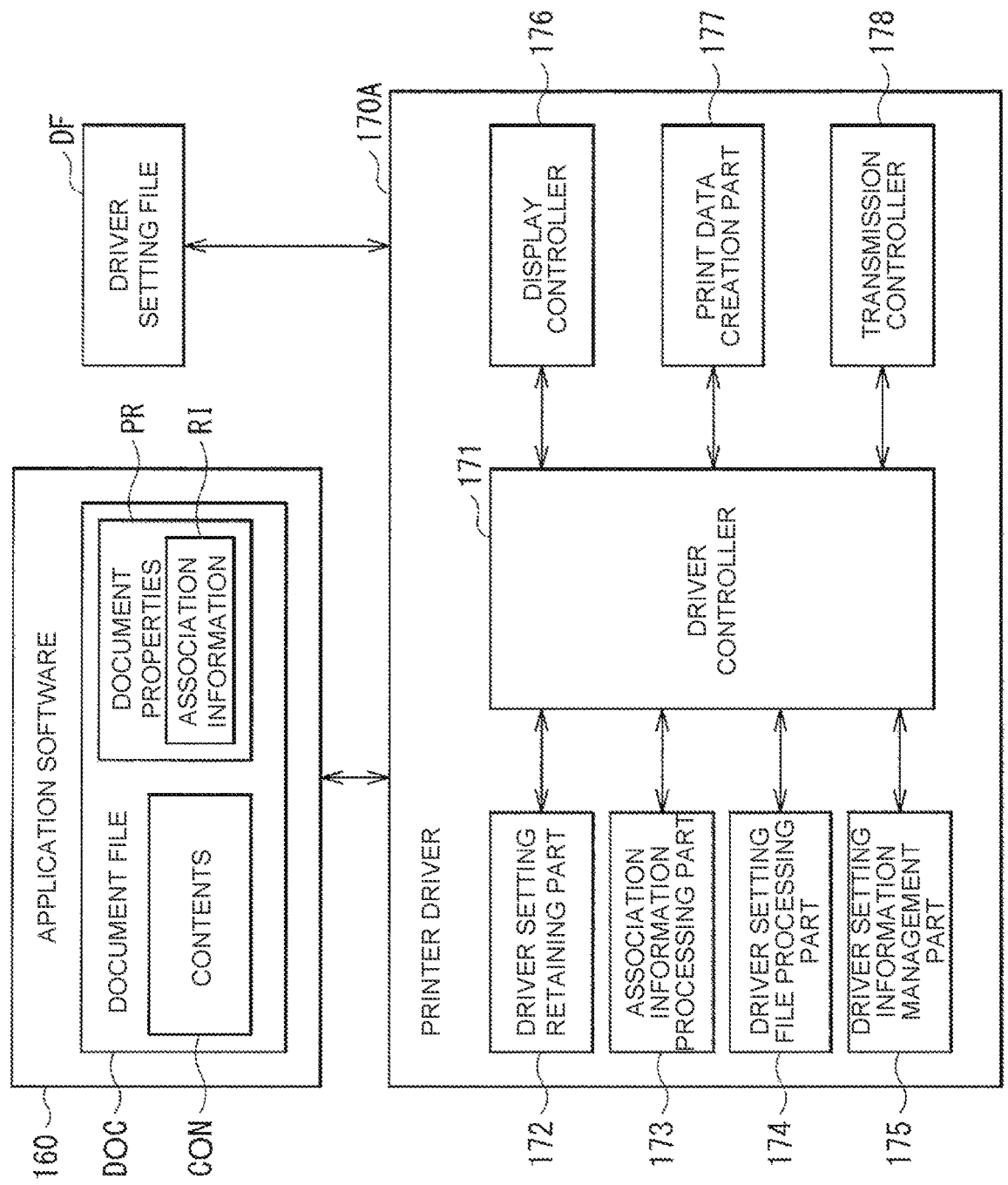
FIG. 4 is a block diagram illustrating a view of a configuration example of software in the information processing apparatus such as being illustrated in FIG. 1.

FIG. 4 illustrates a configuration example of the application software 160 and the printer driver 170A in the information processing apparatus 100A. FIG. 4 also illustrates the relationship of the driver setting file DF and the application software 160 and the printer driver 170A. The configurations of the application software 160 and the printer driver 170B in the information processing apparatus 100B are the same as the configurations (FIG. 4) of the application software 160 and the printer driver 170A of in the information processing apparatus 100A.

In FIG. 4, the application software 160 has opened the document file DOC. The document file DOC includes contents CON and document properties PR. The contents CON is data including image data of advertisement design in this example. The document properties PR is attribute information in which various information about the document file DOC is registered. The document properties PR includes association information RI. The association information RI is information indicating that the document file DOC is associated with the driver setting information DSR to be used for printing of the document file DOC. That is, in the document file DOC, the association information RI associated with the driver setting information DSR is stored.

Figures 5, 6:
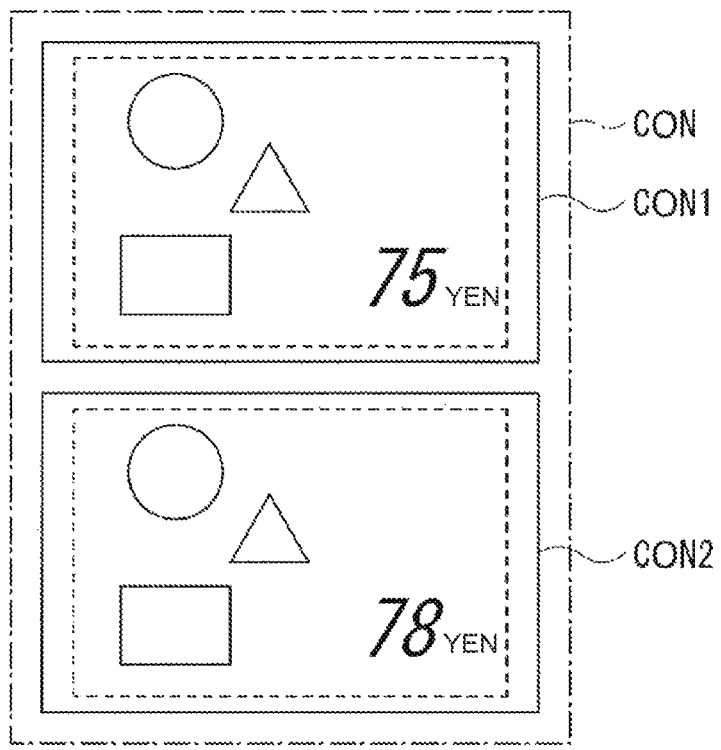
FIG. 5 is a diagram illustrating an explanatory view of an example of contents such as being illustrated in FIG. 4.
FIG. 6 is a diagram illustrating an explanatory view of an example of document properties such as being illustrated in FIG. 4.

FIG. 5 illustrates an example of the contents CON in the document file DOC. In this example, the contents CON includes contents CON1 and CON2. The contents CON1 is an image of a first page of the advertisement design and the contents CON2 is an image of a second page of the advertisement design.

FIG. 6 illustrates an example of the document properties PR of the document file DOC. In this example, the document properties PR includes "Advertisement of March 3rd" indicating a title thereof, "Headquarter" indicating a creator thereof, and "@USE_DRVSET='abc'" indicating comments. Here, "@USE_DRVSET='abc'" is the association information RI, and indicates that the document file DOC is associated with the driver setting information DSR whose driver setting name is "abc".

Each of the printer driver 170A and the printer driver 170B includes a driver controller 171, a driver setting retaining part 172, an association information processing part 173, a driver setting file processing part 174, a driver setting information management part 175, a display controller 176, a print data creation part 177, and a transmission controller 178.

The driver controller 171 is configured to control, based on a user operation, the driver setting retaining part 172, the association information processing part 173, the driver setting file processing part 174, the driver setting information management part 175, the display controller 176, the print data creation part 177, and the transmission controller 178. For example, in the information processing apparatus 100A, the driver controller 171 controls an overall operation of the printer driver 170A by controlling an operation of each block in the printer driver 170A. In the information processing apparatus 100B, the driver controller 171 controls an overall operation of the printer driver 170B by controlling an operation of each block in the printer driver 170B.

The driver setting retaining part 172 is configured to retain the current driver setting including setting values of various print setting items. The driver setting retaining part 172 is also configured to retain, when the setting values of the various print setting items are changed based on instructions from the driver controller 171, the changed setting values as the current driver setting.

The association information processing part 173 is configured, based on instructions from the driver controller 171, to obtain from the application software 160 the association information RI in the document properties PR.

The driver setting file processing part 174 is configured, based on instructions from the driver controller 171, to process the driver setting file DF. For example, in the information processing apparatus 100A, the driver setting file processing part 174 exports (writes), to the storage part 140A, the driver setting information DSR including the driver setting information DSR0 and the control information CI as the driver setting file DF. Further, in the information processing apparatus 1006, the driver setting file processing part 174 retrieves (imports) the driver setting file DF.

The driver setting information management part 175 is configured, based on instructions from the driver controller 171, to manage the current driver setting. For example, in the information processing apparatus 100A, the driver setting information management part 175 is configured to register the setting values of the current driver setting of the printer driver 170A as a new piece (option, candidate) of driver setting information DSA to the printer driver 170A, and to retrieve one of the registered plural pieces (options, candidate) of driver setting information DSA and register the retrieved one as the current driver setting of the printer driver 170A. Further, in the information processing apparatus 1006, the driver setting information management part 175 is configured to register the setting values of the current driver setting of the printer driver 1706 as a new piece (option, candidate) of driver setting information DSB to the printer driver 170B, and to retrieve one of the registered plural pieces (options, candidate) of driver setting information DSB and register the retrieved one as the current driver setting of the printer driver 170B.

The display controller 176 is configured, based on instructions from the driver controller 171, to perform display controls of various user interface screens for the print setting.

The print data creation part 177 is configured, based on instructions from the driver controller 171, to create print data.

The transmission controller 178 is configured, based on instructions from the driver controller 171, to control transmission of the print data. For example, in the information processing apparatus 100A, the transmission controller 178 controls the communication part 110A to transmit the print data to the image formation apparatus 200A. Further, in the information processing apparatus 100B, the transmission controller 178 controls the communication part 110B to transmit the print data to the image formation apparatus 200B.

Here, the driver setting information DSR may be a specific example of "first preset information" in the disclosure. The plurality of driver setting information DSB may be a specific example of a "plurality of preset information" in the disclosure. The association information RI may be a specific example of a "first association information" in the disclosure. The document file DOC may be a specific example of a "target file" in the disclosure. The document properties PR may be a specific example of "attribution information" in the disclosure. The storage part 140B may be a specific example of a "storage part" in the disclosure. The association information processing part 173 may be a specific example of an "acquisition part" in the disclosure.

The display controller 176 may be a specific example of a "display controller" in the disclosure.

[Operations and Actions]

Next, operations and actions of the image formation system 1 according to an embodiment are described below.

(Overview of Overall Operation)

First, with reference to FIGS. 1 and 2, an overview of an overall operation of the image formation system 1 is described below.

In the image formation system 1, the information processing apparatus 100A in the system 2A executes, based on a user operation, the application software 160 to create the document file DOC and stores the document file DOC in association with the driver setting information DSR. The information processing apparatus 100A executes, based on a user operation, the printer driver 170A to export (write) the driver setting information DSR including the driver setting information DSR0 and the control information CI to the driver setting file DF. Then, the information processing apparatus 100A transmits, based on a user operation, the driver setting file DF including the document file DOC and the driver setting information DSR to the system 2B.

In the system 2B, the information processing apparatus 100B executes, based on a user operation, the application software 160 to open the document file DOC transmitted from the information processing apparatus 100A of the system 2A. The information processing apparatus 100B executes, based on a user operation, the printer driver 170B to import (retrieve) the driver setting file DF transmitted from the information processing apparatus 100A of the system 2A and register the retrieved driver setting information DSR to the printer driver 170B. The information processing apparatus 100B creates the print data based on the document file DOC and the driver setting information DSR. The image formation apparatus 200B executes the image formation operation based on the print data, so as to form the image based on the contents CON on the recording medium PM.

After that, if a user wants to reprint based on the document file DOC in the system 2B, the information processing apparatus 100B executes, based on a user operation, the application software 160 again to open the document file DOC. The information processing apparatus 100B executes, based on a user operation, the printer driver 170B to display the print setting screen SCP. The information processing apparatus 100B creates, based on a user operation on the print setting screen SCP, the selection list LI1 and preferentially displays the driver setting information DSR in the selection list LI1. When the information processing apparatus 100B selects, based on a user operation on the print setting screen SCP, the driver setting information DSR from the selection list LI1, the information processing apparatus 100B creates the print data based on the document file DOC and the driver setting information DSR. The image formation apparatus 200B performs the image formation operation based on the print data thereby to form the image indicating the contents CON on the recording medium PM.

(Detailed Operations)

Hereinafter, a process of distributing the document file DOC and the driver setting file DF from the system 2A is described in detail and then a printing process and a reprinting process based on the document file DOC and the driver setting file DF in the system 2B are described in detail.

(Distribution Process in System 2A)

Figure 7:
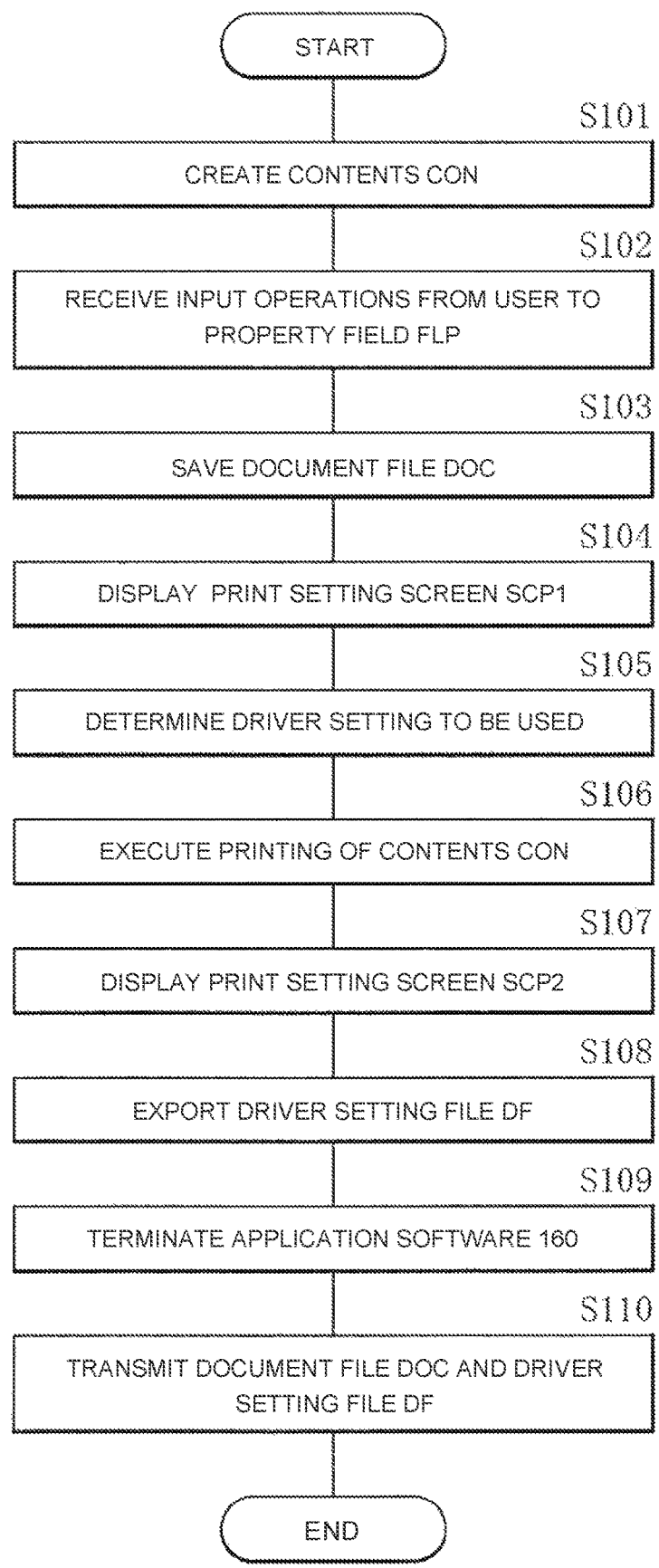
FIG. 7 is a flowchart illustrating an example of processing in the information processing apparatus such as being illustrated in FIG. 1.

FIG. 7 illustrates an operation example of the distribution process. In the distribution process, based on a user operation, the information processing apparatus 100A creates the document file DOC, stores the document file DOC in association with the driver setting information DSR, exports (writes) the driver setting file DF including the driver setting information DSR, and transmits the document file DOC and the driver setting file DF to the system 2B. For example, when the controller 150A executes, based on a user operation, the application software 160, the distribution process illustrated in FIG. 7 is started. The process is described below in detail.

First, the application software 160 creates, based on a user operation, the contents CON (Step S101). For example, the application software 160 creates, based on a user operation, the contents CON by performing drawing processing of characters and graphics, image data retrieving processing, and/or the like. For this processing, the application software 160 displays an edit screen SCE1 to edit the contents CON.

Figure 8:
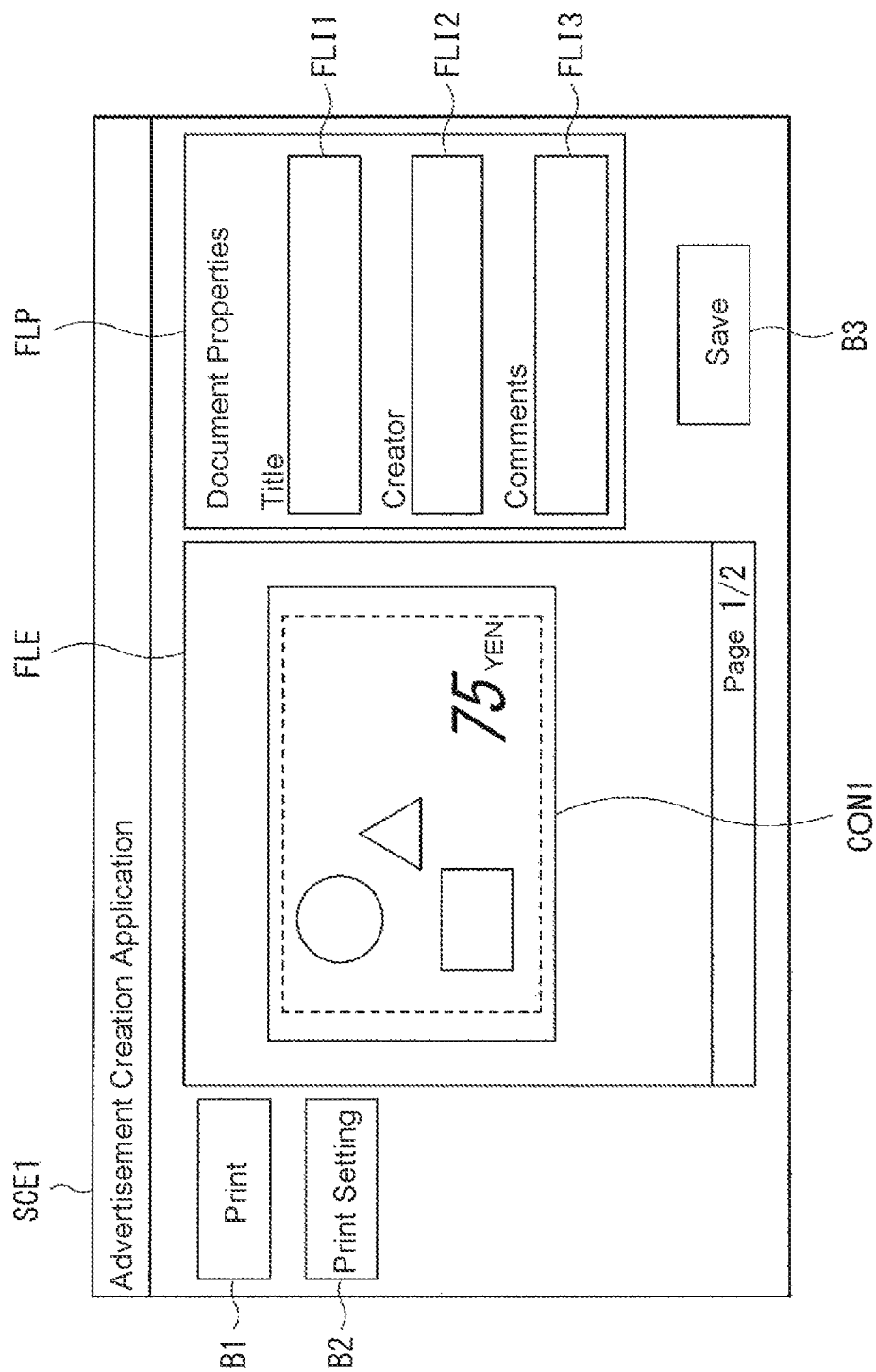
FIG. 8 is a diagram illustrating a view of an example of a display screen of application software such as being illustrated in FIG. 2.

FIG. 8 illustrates an example of the edit screen SCE1. The edit screen SCE1 includes an edit field FLE, a property field FLP, and buttons B1 to B3. The edit field FLE is a field through which the contents CON can be edit. In this example, the contents CON1 in the contents CON is displayed in the edit field FLE. The property field FLP is a field through which data to be stored in the document properties PR can be input. The property field FLP includes input fields FLI1 to FLI3. The input field FLI1 is a field though which data indicating a title can be input. The input field FLI2 is a field through which data indicating a creator can be input. The input field FLI3 is a field through which data indicating comments can be input. In the example illustrated in FIG. 8, data have not entered yet in the input fields FLI1 to FLI3. The button B1 is a button to print the contents CON. The button B2 is a button for the print setting. The button B3 is a button to store the document file DOC including the created contents CON along with the document properties PR thereof. Note that in the example illustrated in FIG. 8, the edit field FLE, the property field FLP, and the buttons B1 to B3 are displayed in one screen. However, an embodiment is not limited to this configuration. For example, a part of the edit field FLE, the property field FLP, and the buttons B1 to B3 may be displayed in another screen different from the screen SCE1.

Next, the operation part 130A receives input operations from the user to the property field FLP in the edit screen SCE1 (Step S102).

Figure 9:
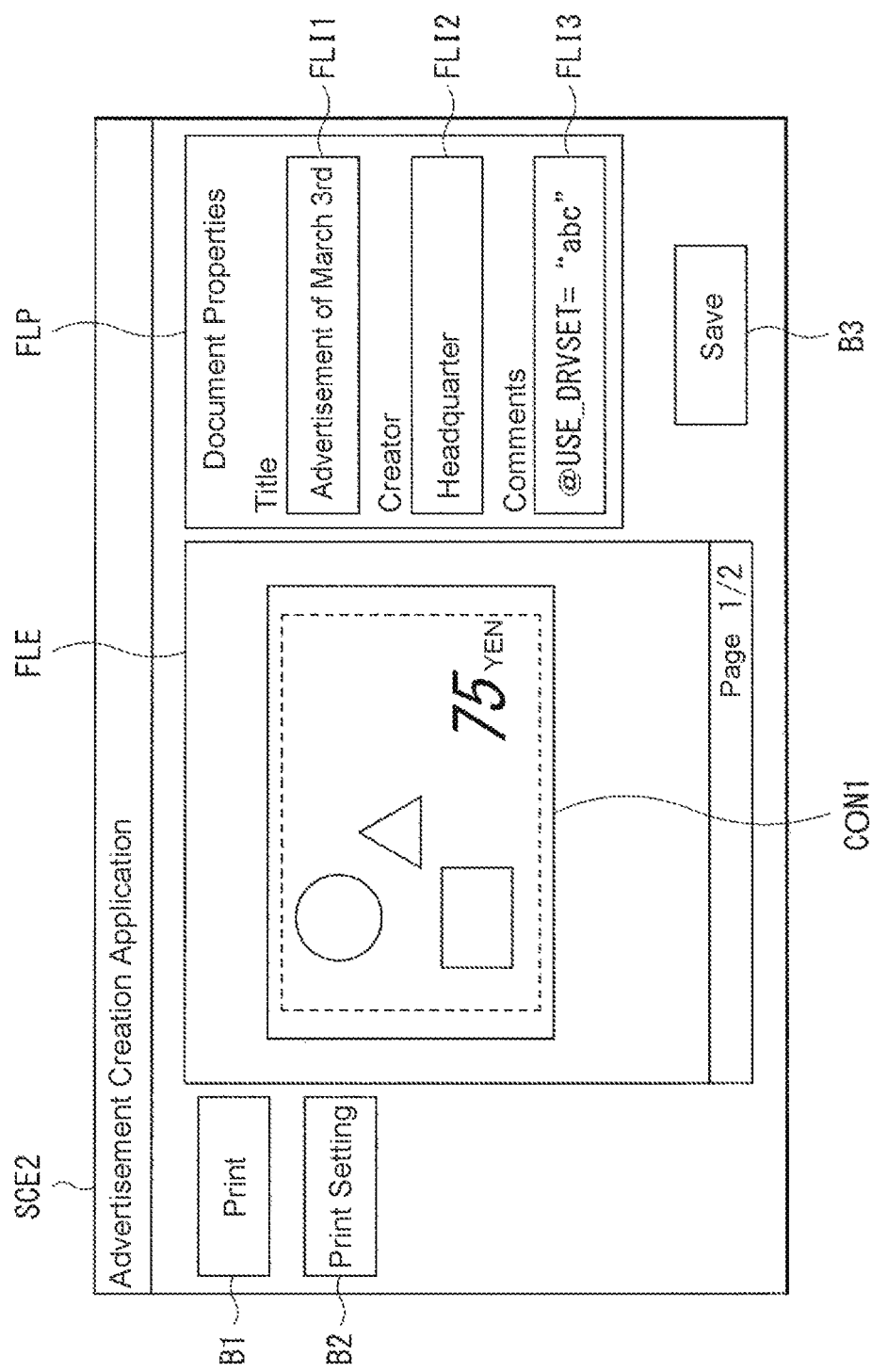
FIG. 9 is a diagram illustrating a view of another example of the display screen of the application software illustrated in FIG. 8.

FIG. 9 illustrates an example of an edit screen SCE2 after the user's input operations. In the property field FLP of the edit screen SCE2, data has been input from the user. In the example illustrated in FIG. 9, "Advertisement of March 3rd", "Headquarter", and "@USE_DRVSET="abc"" have been input in the input field FLI1, the input field FLI2, and the input field FLI3, respectively.

Next, the application software 160 stores, based on a user operation, the document file DOC to the storage part 140A (Step S103). For example, the operation part 130A receives a user operation to the button B3 in the edit screen SCE2. With this, the application software 160 stores the contents CON and the document properties PR as the document file DOC into the storage part 140A. That is, in the document file DOC, the association information RI associated with the driver setting information DSR is stored.

Next, the printer driver 170A displays, based on a user operation, a print setting screen SCP1 to set the print settings (Step S104). For example, the operation part 130A receives a user operation to the button B2 in the edit screen SCE2. With this, the application software 160 invokes the printer driver 170A to cause the display controller 176 to control display of the print setting screen SCP1.

Figure 10:
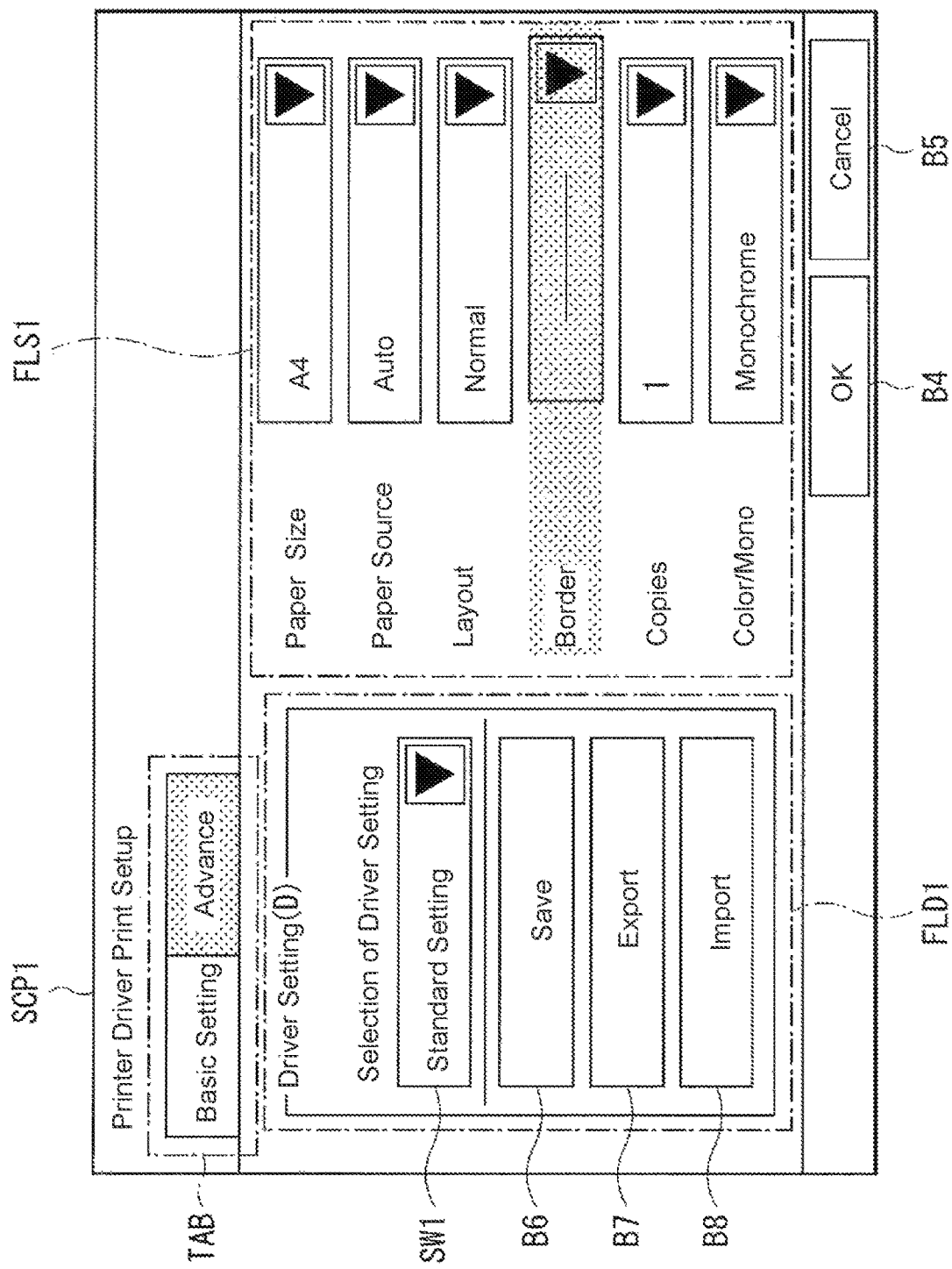
FIG. 10 is a diagram illustrating a view of an example of a display screen of the printer driver such as being illustrated in FIG. 2.

FIG. 10 illustrates an example of the print setting screen SCP1. The print setting screen SCP1 includes a switching tab TAB, buttons B4 and B5, a setting field FLS1, and a setting management field FLD1. The switching tab TAB is a switch to switch setting items to be displayed. For example, when the user selects "Basic settings" in the switching tab TAB, basic setting items such as paper size or the like are displayed in the print setting screen SCP1. The setting field FLS1 is a field to set (edit) the current driver setting. The button B4 is a button to determine (set) the setting values displayed in the setting field FLS1 (the current driver setting) as the driver setting to be used for printing. The button B5 is a button to cancel changes in the setting values displayed in the setting field FLS1 and to close the print setting screen SCP1. In this example, in the setting field FLS1, the user can set (edit) setting values of the setting items "Paper Size", "Paper Source", "Layout", "Border", "Copies", and "Color/Monochrome". In the example illustrated in FIG. 10, the setting values of the setting items "Paper Size", "Paper Source", "Layout", "Copies", and "Color/Monochrome" are set to "A4", "Auto", "Normal", "1", and "Monochrome", respectively. Note that in this example, since the setting value of the setting item "Layout" is set to "Normal", the frame border cannot be set. The setting management field FLD1 is a field to perform various management processes for the driver setting information DSA. The setting management field FLD1 includes a switch SW1, and buttons B6 to B8. The switch SW1 is a so-called pull-down list and is configured to display the selection list LI1 and accepts user's selection operation. The switch SW1 displays, when receiving the user's selection operation, a driver setting name of the selected piece (option) of driver setting information DSA selected by the user. The button B6 is a button to register (save) the current driver setting of the printer driver 170A as a new piece (option) of driver setting information DSA. The button B7 is a button to register (save) the current driver setting of the printer driver 170A as a new piece (option) of driver setting information DSA and to export the current driver setting of the printer driver 170A as the driver setting file DF to the storage part 140A. The button B8 is a button to import (retrieve) the driver setting file DF from the storage part 140A.

Next, the printer driver 170A determines, based on a user operation, the driver setting to be used (Step S105). For example, when the operation part 130A receives a user operation with respect to the setting field FLS1, the current driver setting of the printer driver 170A in the setting field FLS1 is changed and stored in the driver setting retaining part 172.

Figure 11:
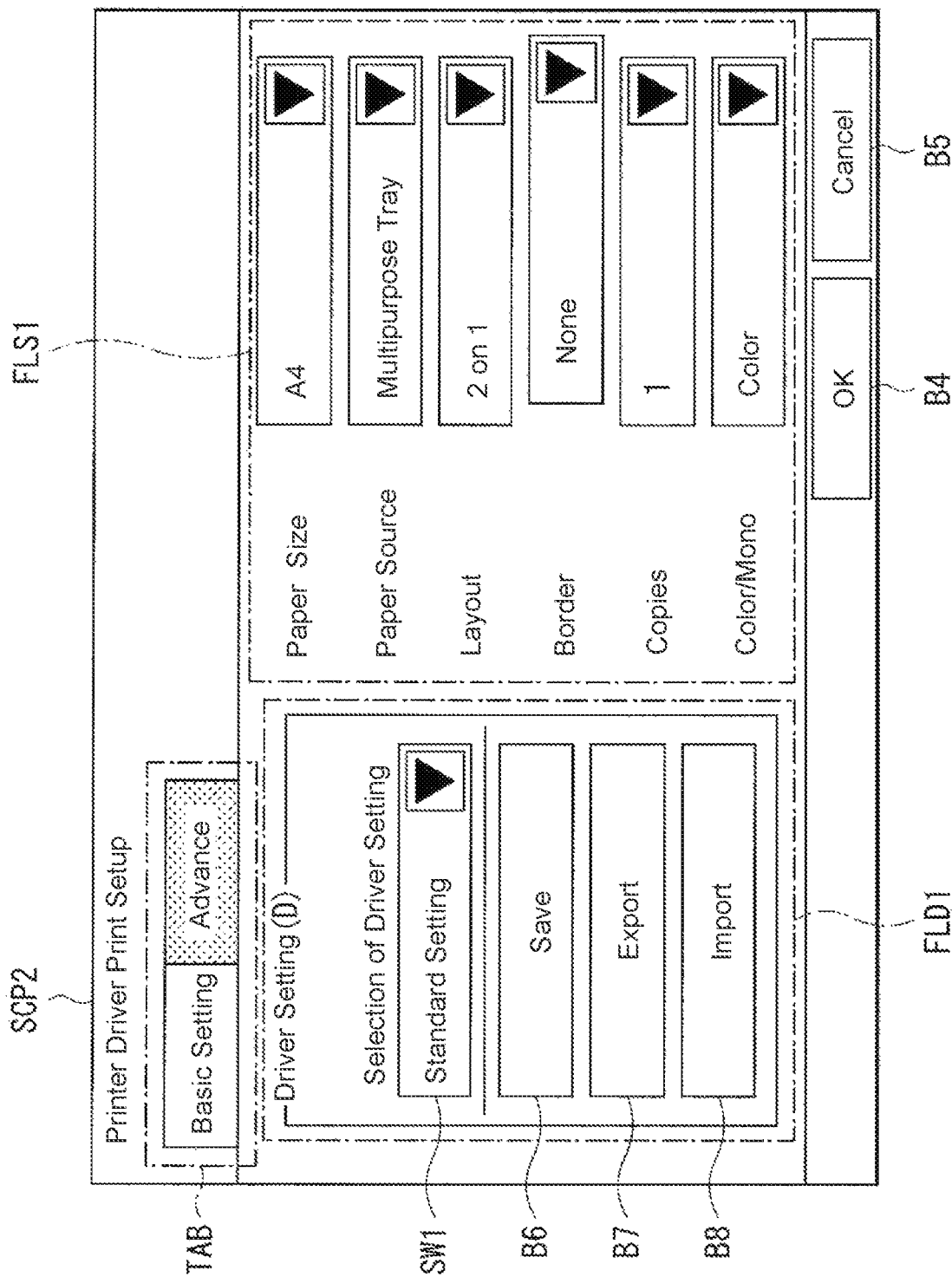
FIG. 11 is a diagram illustrating a view of another example of the display screen of the printer driver illustrated in FIG. 10.

FIG. 11 illustrates an example of a print setting screen SCP2 after the user operation. In this example, in the setting field FLS1, the setting values of the items "Paper Size", "Paper Source", "Layout", "Border", "Copies", and "Color/Monochrome" are set to "A4", "Multipurpose Tray", "2 on 1", "None", "1", "Color", respectively.

When the operation part 130A receives user operation to the button B4 in the print setting screen SCP2 (when the button B4 is clicked), the printer driver 170A determines the current driver setting (the driver setting displayed in the setting field FLS1) as the driver setting to be used for printing and the display controller 176 executes the display control to close the print setting screen SCP2.

Next, the printer driver 170A executes, based on a user operation, printing of the contents CON (Step S106). For example, the operation part 130A receives a user operation to the button B1 in the edit screen SCE2 (FIG. 9). With this, the print data creation part 177 creates the print data of the contents CON under the driver setting that are selected through the print setting screen SCP2 (FIG. 11). The transmission controller 178 controls the communication part 110A to transmit the print data to the image formation apparatus 200A. Thus, the communication part 110A transmits the print data to the image formation apparatus 200A. The image formation apparatus 200A executes the image formation operations based on the print data, so as to form the image of the contents CON on the recording medium PM.

Figure 12:
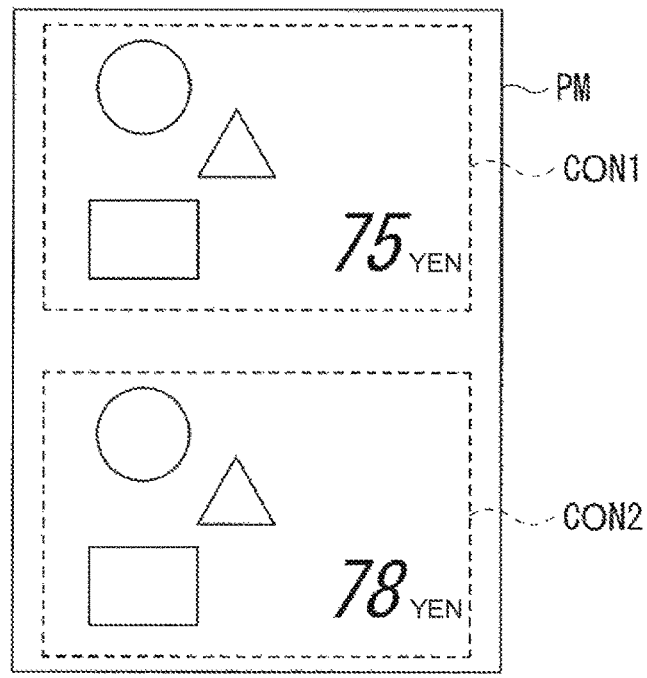
FIG. 12 is a diagram illustrating an explanatory view of a print result of contents such as being illustrated in FIG. 4.

FIG. 12 illustrates an example of the recording medium PM on which the image of the contents CON is formed. In the example illustrated in FIG. 12, the image formation apparatus 200A forms a "color" image of the contents CON1 for the first page and a "color" image of the contents CON2 for the second page arranged vertically on an "A4" size recording medium PM supplied from "Multipurpose Tray".

Next, the printer driver 170A displays, based on a user operation, the print setting screen SCP2 (Step S107). For example, the operation part 130A receives a user operation to the button B2 in the edit screen SCE2 (FIG. 9). With this, the application software 160 calls the printer driver 170A and thus the display controller 176 executes the display control of the print setting screen SCP2 (FIG. 11).

Next, the printer driver 170A exports, based on a user operation, the driver setting file DF to the storage part 140A (Step S108). For example, when the operation part 130A receives a user operation the button B7 in the print setting screen SCP2 (FIG. 11), the display controller 176 executes display control to display a registration screen SCS1 for registering the current driver setting as one piece (option) of driver setting information DSA to the printer driver 170A.

Figure 13:
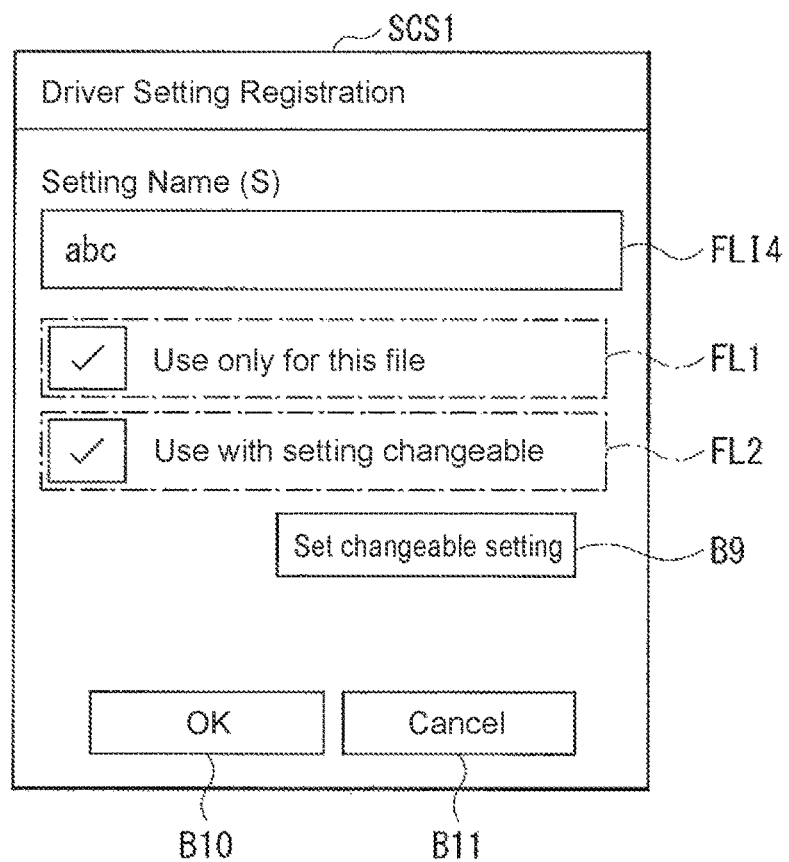
FIG. 13 is a diagram illustrating a view of an example of a display screen of the printer driver such as being illustrated in FIG. 2.

FIG. 13 illustrates an example of the registration screen SCS1. The registration screen SCS1 includes an input field FLI4, fields FL1 and FL2, and buttons B9 to B11. The input field FLI4 is a field to input a name (a driver setting name) given to the driver setting information DSA to be registered through the registration screen SCS1. In the example illustrated in FIG. 13, based on a user operation to the input field FLI4 through the operation part 130A, "abc" is input in the input field FLI4. The field FL1 is a field to specify whether the driver setting information DSA to be registered through the registration screen SCS1 is to be used for only the document file DOC. In the example illustrated in FIG. 13, based on a user operation to the field FL1 through the operation part 130A, it is specified that the driver setting information DSA to be registered is to be used only for this document file DOC (the check box in the field FL1 has a check mark). The field FL2 is a field to specify whether changes of the setting values of the various print setting items are allowed or not. In the example illustrated in FIG. 13, based on a user operation to the field FL2 through the operation part 130A, changes of the setting values of the various print setting items are allowed (the check box in the field FL2 has a check mark). Note that, in a case where it is not specified in the field FL2 that changes of the setting values of the various print setting items are allowed, changes of the setting values of all of the various setting items are not allowed. The button B9 is a button to specify one or more of the various print setting items whose setting value is allowed to be changed. The button B10 is a button to register the current driver setting as a new piece (option) of driver setting information DSA to the printer driver 170A. The button B11 is a button to cancel the registration of the current driver setting as a new piece (option) of driver setting information DSA to the printer driver 170A.

When the operation part 130A receives a user operation to the button B9 in the registration screen SCS1, the display controller 176 displays a registration screen SCS2 (see FIG. 14) for specifying one or more of the print setting items whose setting value is allowed to be changed.

FIG. 14 illustrates an example of the registration screen SCS2. The registration screen SCS2 includes fields FL3 to FL5 and buttons B12 and B13. The field FL3 is a field that displays names of the various print setting items. The field FL4 is a field for setting whether to permit changes of the setting value of each of the print setting items. In the field FL4, the user can switch between "Permit" and "Not permit" in the each print setting item, wherein "Permit" indicates that changes of the setting value of the print setting item is allowed and "Not permit" indicates that changes of the setting value of the print setting item is not allowed. The field FL5 is a field to indicate the setting values of the various print setting items. In the example illustrated in FIG. 14, the setting value of the print setting item "Paper Size" is set to "A4", and is not allowed to be changed. The setting value of the print setting item "Paper Source" is set to "Multipurpose Tray" and is not allowed to be changed. The setting value of the print setting item "Layout" is set to "2 on 1" and is not allowed to be change. The setting value of the print setting item "Border" is set to "None" and is not allowed to be changed. The setting value of the print setting item "Copies" is set to "1" and is allowed to be changed. The setting value of the print setting item "Color/Monochrome" is set to "Color" and is not allowed to be changed. That is, in the example illustrated in FIG. 14, changes of the setting values of the print setting items "Paper Size", "Paper Source", "Layout", "Border", and "Color/Monochrome" are not allowed, but a change of the setting value of the print setting item "Copies" is allowed. The button B12 is a button to set (register) one or more the print setting items whose setting value is allowed to be changed, that is, to set (register) the values input in the field FL4. The button B13 is a button to cancel the setting (registration) of the input values in the field FL4.

When the operation part 130A receives user operation to the button B12 in the register screen SCS2, the display controller 176 closes the display of the register screen SCS2. Then, when the operation part 130A receives a user operation to the button B10 in the registration screen SCS1 (FIG. 13), the driver setting information management part 175 registers, to the printer driver 170A, the current driver setting retained in the driver setting retaining part 172 as a new piece (option) of driver setting information DSA. In the case where the value "abc" is input in the input field FLI4 (FIG. 13), the driver setting name of the registered new piece of driver setting information DSA is set to "abc", and the registered new piece of driver setting information DSA is associated with the document file DOC as illustrated in FIG. 6. That is, the registered new piece of driver setting information DSA is the driver setting information DSR0. Then, the display controller 176 displays an export screen SCW1 for exporting the driver setting file DF to the storage part 140A.

Figure 15:
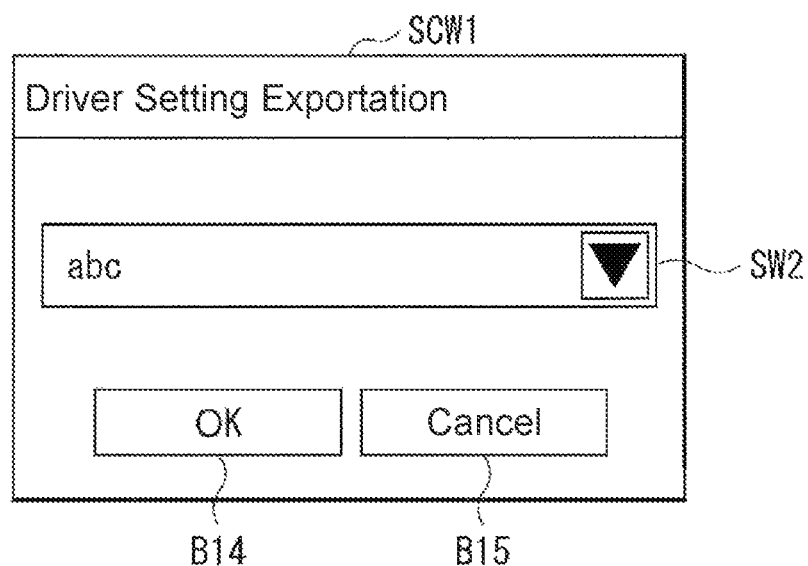
FIG. 15 is a diagram illustrating a view of an example of a display screen of the printer driver such as being illustrated in FIG. 2.

FIG. 15 illustrates an example of the export screen SCW1. The export screen SCW1 includes a switch SW2 and buttons B14 and B15. The switch SW2 is configured to display a list indicating plural options of the driver setting information DSA and to receive user operations to select one of the options. When the switch SW2 receives a user operation that selects one of the options, the switch SW2 displays the driver setting name of the selected driver setting information DSA. In the example illustrated in FIG. 15, the switch SW2 displays "abc", which is the driver setting name of the driver setting information DSR0 registered in the registration screen SCS1. The button B14 is a button to export the driver setting file DF to the storage part 140A. The button B15 is a button to cancel the export of the driver setting file DF to the storage part 140A.

When the operation part 130A receives a user operation to the button B14 in the export screen SCW1, the driver setting file processing part 174 exports the driver setting information DSR as the driver setting file DF. With this, the driver setting file DF is saved in the storage part 140A. In response to this, the display controller 176 executes display control to display an export screen SCW2 that indicates that the driver setting file DF has been saved.

Figure 16:
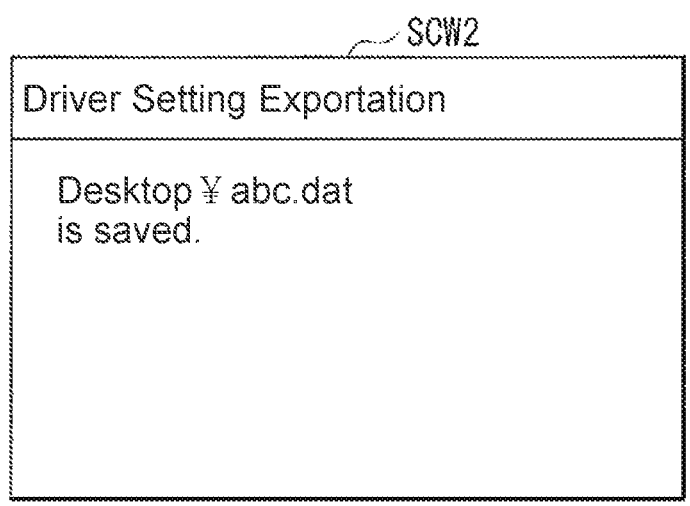
FIG. 16 is a diagram illustrating a view of an example of a display screen of the printer driver such as being illustrated in FIG. 2.

FIG. 16 illustrates an example of the export screen SCW2. In the example illustrated in FIG. 16, the export screen SCW2 indicates that the driver setting file DF is saved as "abc.dat". The display controller 176 executes display control to close the display of the export screen SCW2 after a predetermined time.

FIG. 17 illustrates a configurational example of the driver setting file DF. The driver setting file DF includes the driver setting information DSR. The driver setting information DSR includes: the driver setting information DSR0 including the setting values of the various print setting items to be used for the printing process; and the control information CI to execute the display control in the information processing apparatus 100B. The control information CI is created in response to user operations to the registration screens SCS1 and SCS2 (FIGS. 13 and 14). In the control information CI, control information regarding the item "Use only for this file" is set based on a user operation to the field FL1 of the registration screen SCS1 (FIG. 13), and the setting value of the item is set to "Only for this file" or "Not only for this file". In this example, since it has been specified through the field FL1 in the registration screen SCS1 (FIG. 13) that a new piece of driver setting information DSA to be registered should be used in association with the document file DOC, the setting value "Only for this file" is set in the driver setting file DF (FIG. 17). On the other hand, in the case where it has not specified through the field FL1 in the registration screen SCS1 (FIG. 13) that a new piece of driver setting information DSA to be registered should be used in association with the document file DOC, the setting value "Not only for this file" is set in the driver setting file DF (FIG. 17). Control information regarding the item "Use with setting changeable" is set, based on a user operation to the field FL2 (FIG. 13) of the registration screen SCS1 and the setting value of the item "Use with setting changeable" is "Changeable" or "Unchangeable". In the example illustrated in FIG. 17, "Changeable" is set in the field FL2, because it has been specified that changes of the setting values of various print setting items are allowed. In a case where it has not been specified that changes of the setting values of various print setting items are allowed, the setting value "Use with setting unchangeable" is set in the field FL2. Control information regarding the print setting items "Paper Size", "Paper Source", "Layout", "Border", "Copies", "and Color/Monochrome" are set based on a user operation to the field FL4 (FIG. 14) of the register screen SCS2, and the setting value thereof is set to "Change is permitted" or "Change is not permitted." In the example illustrated in FIG. 17, the control information regarding each of the items "Paper Size", "Paper Source", "Layout", "Border", and "Color/Monochrome" is set to "Change is not permitted", and the control information regarding the item "Copies" is set to "Change is permitted".

Next, as illustrated in FIG. 7, the controller 150A terminates, based on a user operation, the application software 160 (Step S109).

Next, the information processing apparatus 100A transmits, based on a user operation, the document file DOC and the driver setting file DF (Step S110). For example, the controller 150A controls, based on a user operation, the communication part 110A to transmit the document file DOC and the driver setting file DF to the information processing apparatus 100B. Thus, the communication part 110A transmits the document file DOC and the driver setting file DF to the information processing apparatus 100B. For example, the information processing apparatus 100A transmits, based on a user operation, the document file DOC and the driver setting file DF by email.

This is the end of this flow.

(Printing Process in System 2B)

Figure 18:
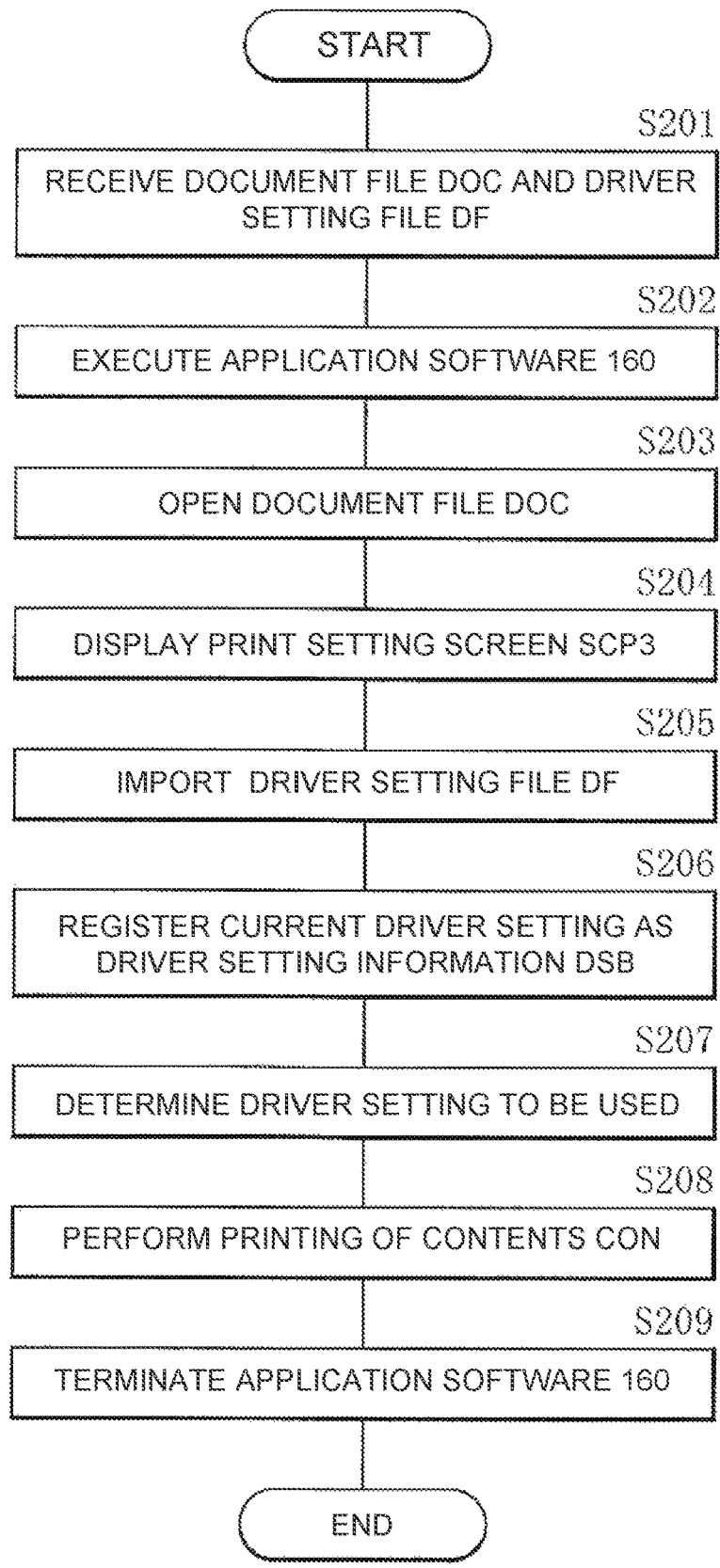
FIG. 18 is a flowchart illustrating an example of processing in an information processing apparatus such as being illustrated in FIG. 1.

FIG. 18 illustrates an operational example of the printing process in the system 2B. In the printing process, the information processing apparatus 100B opens, based on a user operation, the document file DOC, imports (retrieves) the driver setting file DF, and creates the print data based on the document file DOC and the driver setting file DF. The printing process in the system 2B starts the processes in response to the transmission of the document file DOC and the driver setting file DF from the information processing apparatus 100A to the information processing apparatus 100B. The operation is explained in detail below.

The information processing apparatus 100B receives the document file DOC and the driver setting file DF transmitted from the information processing apparatus 100A (Step S201). Specifically, the communication part 110B receives the document file DOC and the driver setting file DF transmitted from the information processing apparatus 100A.

Next, the controller 150B executes, based on a user operation, the application software 160 (Step S202).

Next, the application software 160 opens, based on a user operation, the document file DOC (Step S203). For example, the application software 160 obtains, based on a user operation, the contents CON and the document properties PR of the document file DOC. In response to this, the application software 160 displays the edit screen SCE2 (FIG. 9). In the input fields FLI1, FLI2, and FLI3, values "March 03", "Headquarter", "@USE_DRVSET="abc"" are input respectively.

Next, the printer driver 170B displays, based on a user operation, a print setting screen SCP3 that prompts the user to import (retrieve) the driver setting file DF (Step S204). Specifically, the operation part 130B receives user operation to the button B2 in the edit screen SCE2 (FIG. 9). With this, the application software 160 calls (activates) the printer driver 170B. The association information processing part 173 in the printer driver 170B obtains the association information RI in the document properties PR from the application software 160. When the driver setting information DSR to be used for printing of the document file DOC, which is identified by the association information RI, is not registered in the printer driver 170B, the display controller 176 displays the print setting screen SCP3.

Figure 19:
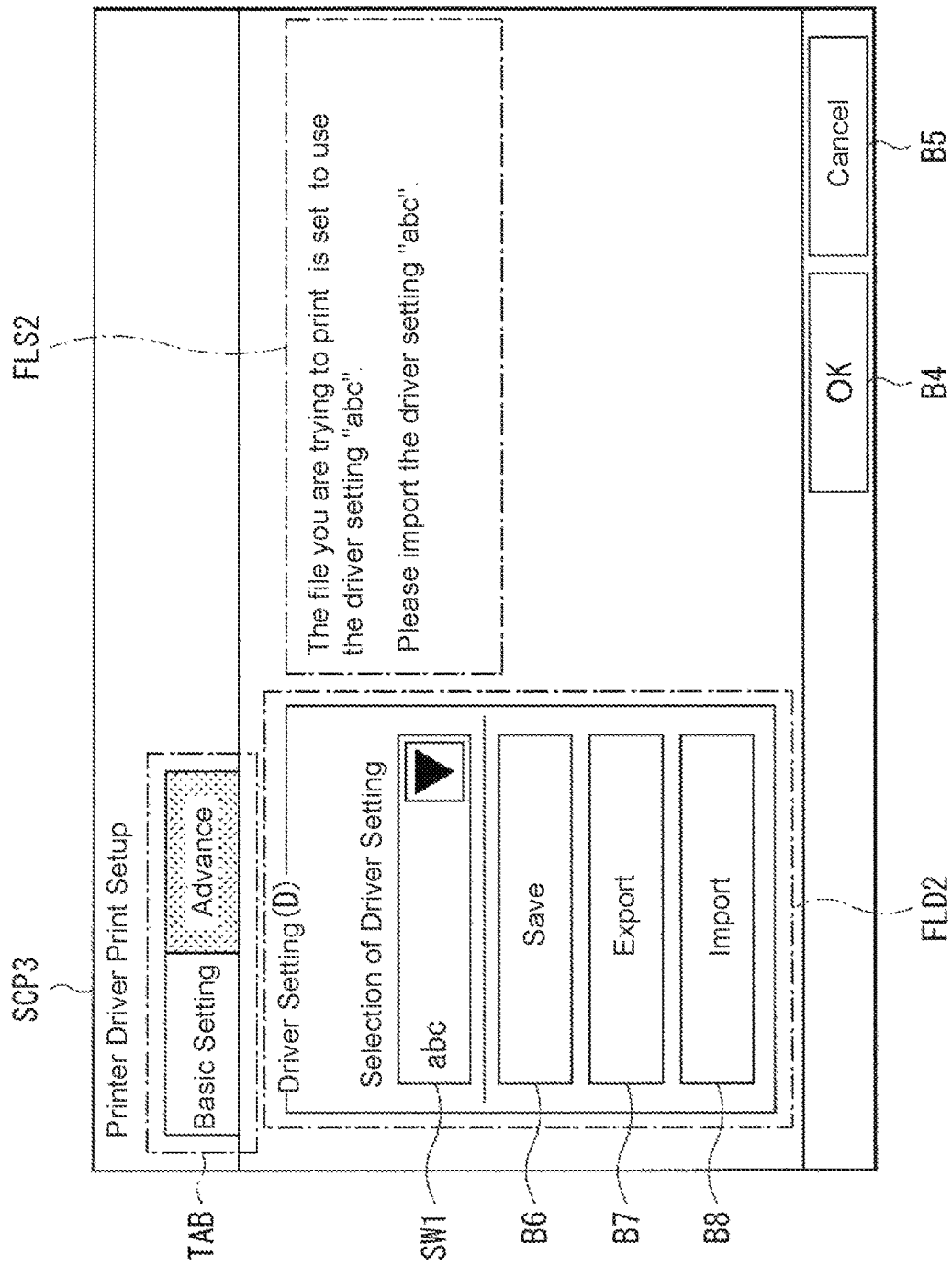
FIG. 19 is a diagram illustrating a view of an example of a display screen of the printer driver such as being illustrated in FIG. 2.

FIG. 19 illustrates an example of the print setting screen SCP3. The print setting screen SCP3 includes a setting field FLS2 and a setting management field FLD2. The setting field FLS2 is a field that prompts the user to import (retrieve) the driver setting file DF. In the example illustrated in FIG. 19, the setting field FLS2 prompts the user to import (retrieve) the driver setting file DF that includes the driver setting information DSR whose driver setting name is "abc". The setting management field FLD2 is a field for various management processes on the driver setting information DSB. In the example illustrated in FIG. 19, the driver setting name of the driver setting information DSR is displayed in the switch SW1 of the setting management field FLD2.

Next, the printer driver 170B imports (retrieves), based on a user operation, the driver setting file DF (Step S205). For example, when the operation part 130B receives user operation to the button B8 in the print setting screen SCP3 (FIG. 19), the display controller 176 executes display control to display an import screen SCR1 to import (retrieve) the driver setting file DF.

Figure 20:
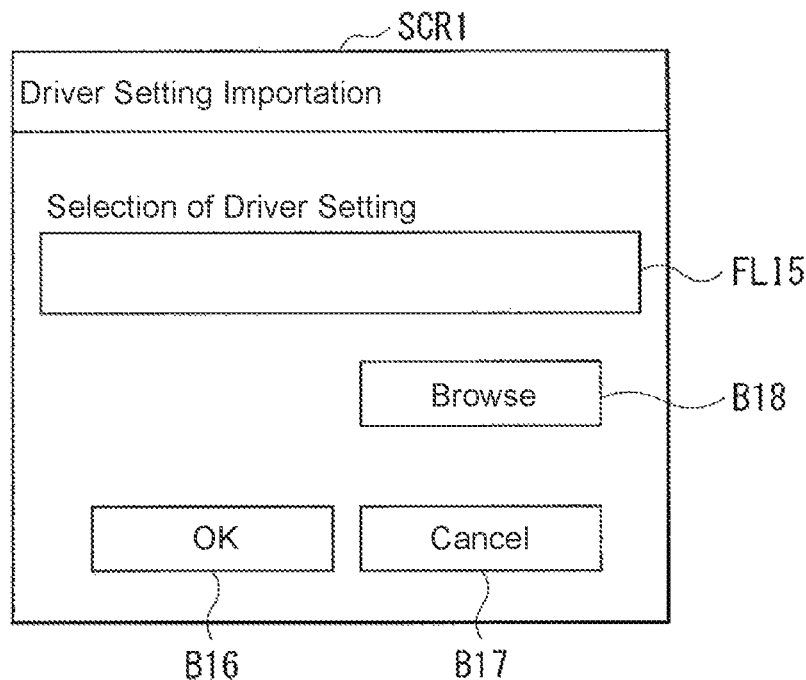
FIG. 20 is a diagram illustrating a view of an example of a display screen of the printer driver such as being illustrated in FIG. 2.

FIG. 20 illustrates an example of the import screen SCR1. The import screen SCR1 includes an input field FLI5 and buttons B16 to B18. The input field FLI5 is a field in which an address (reference destination) of the driver setting file DF is input. In the example illustrated in FIG. 20, any data have not yet input in the input field FLI5. The button B16 is a button to import the driver setting file DF. The button B17 is a button to cancel to import the driver setting file DF. The button B18 is a button to browse the driver setting file DF.

When the operation part 130B receives a user operation to the button B18 in the import screen SCR1, the display controller 176 displays a screen for selecting the address of the driver setting file DF. The driver setting file processing part 174 determines, based on a user operation in this screen, the address of the driver setting file DF. Then, the display controller 176 displays an import screen SCR2 in which the address of the driver setting file DF has been input.

Figure 21:
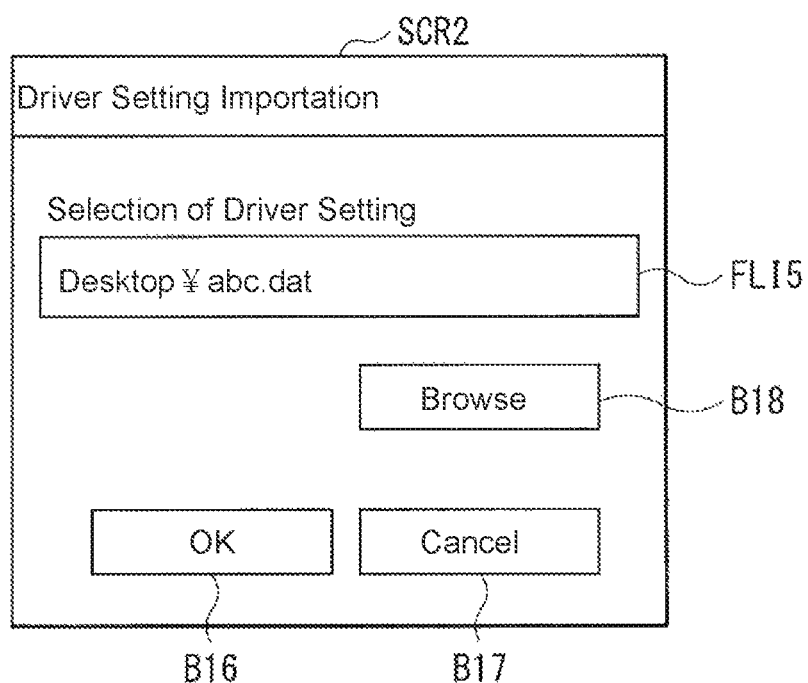
FIG. 21 is a diagram illustrating a view of another example of the display screen of the printer driver illustrated in FIG. 20.

FIG. 21 illustrates an example of the import screen SCR2. In the input field FLI5, the value "Desktop¥abc.dat" has been input. When the operation part 130B receives a user operation to the button B16 in the import screen SCR2, the display controller 176 closes the display of the import screen SCR2 and displays a print setting screen SCP4 in which the driver setting file DF has been imported (retrieved).

Figure 22:
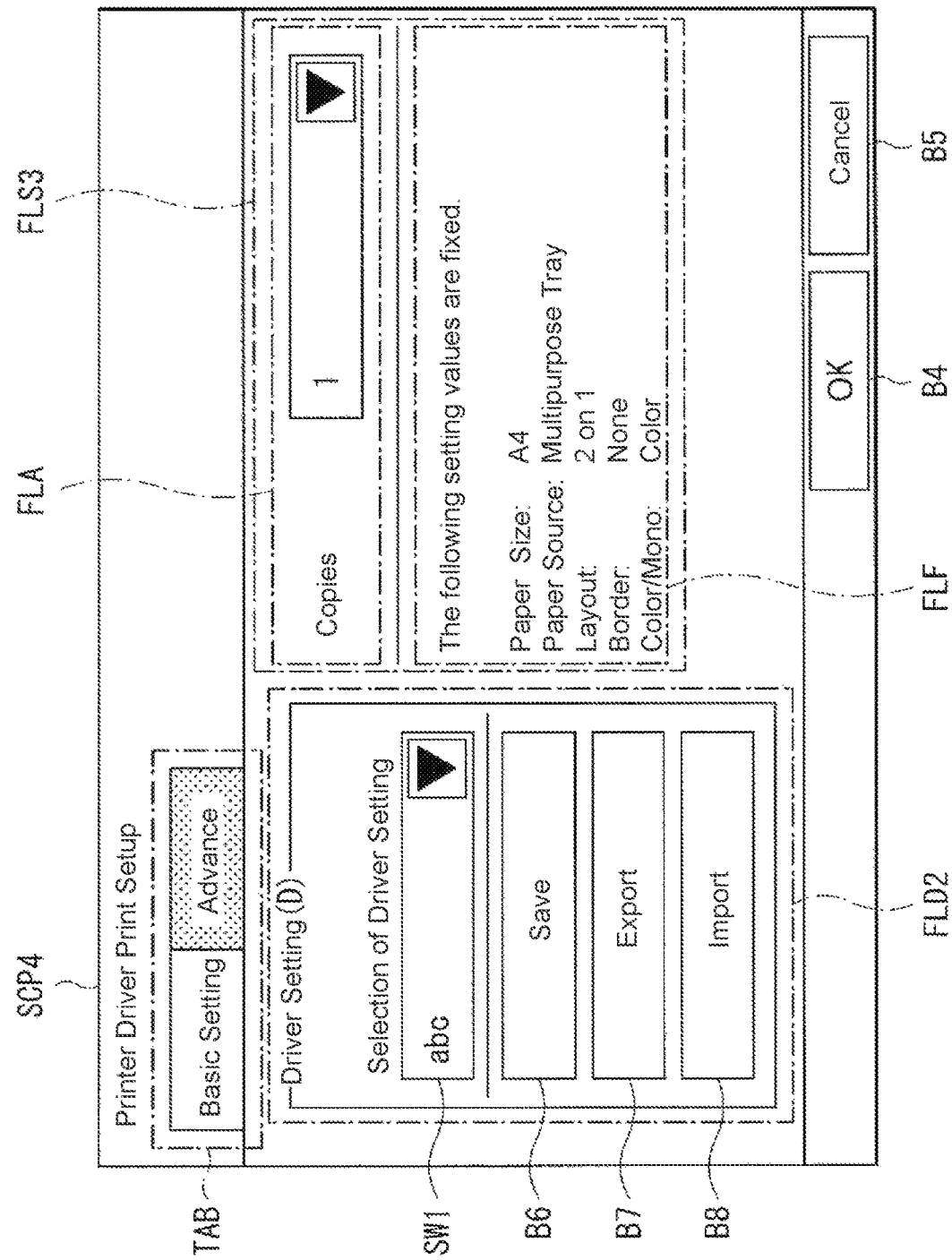
FIG. 22 is a diagram illustrating a view of an example of a display screen of the printer driver such as being illustrated in FIG. 2.

FIG. 22 illustrates an example of the print setting screen SCP4. The print setting screen SCP4 includes a setting field FLS3. The setting field FLS3 is a field that displays the setting values of the print setting items retrieved from the driver setting file DF as the current driver setting of the printer driver 170B. The setting field FLS3 includes a variable setting field FLA and a fixed setting field FLF. The variable setting field FLA is a field that displays one or more of the print setting items whose setting value is set by the driver setting file DF to be allowed to be changed and in which the setting value thereof can be changed. In the example illustrated in FIG. 17, the setting value of the print setting item "Copies" can be changed by the user through the variable setting field FLA, since the driver setting file DF indicates the setting value of the print setting item "Copies" is allowed to be changed. The fixed setting field FLF is a field that displays one or more of the print setting items whose setting value is set by the driver setting file DF not to be allowed to be changed. In the example illustrated in FIG. 17, since the driver setting file DF indicates that the setting values of the print setting items "Paper Size", "Paper Source", "Layout", "Border", and "Color/Monochrome" are not allowed to be changed, the fixed setting values of these print setting items are displayed.

Next, the printer driver 170B registers, based on a user operation, the current driver setting of the printer driver 170B as a new piece (option) of the driver setting information DSB to the printer driver 170B (Step S206). For example, when the operation part 130B receives a user operation to the button B6 in the print setting screen SCP4 (FIG. 22), the driver setting information management part 175 registers the current driver setting retained in the driver setting retaining part 172 as a new piece (option) of driver setting information DSB to the printer driver 170B. In this way, based on the association information RI included in the document file DOC, the driver setting information DSR included in the driver setting file DF is set as the current driver setting of the printer driver 170B and also as a new piece (option) of driver setting information DSB. That is, the newly registered piece of driver setting information DSB in the printer driver 170B is same as the driver setting information DSR transmitted from the system 2A.

Next, the printer driver 170B determines, based on a user operation, the driver setting that is to be used for printing (Step S207). For example, when the operation part 130B receives a user operation to the variable setting field, the setting value(s) of the print setting item(s) in the variable setting field FLA is changed.

When the operation part 130B receives a user operation to the button B4 in the print setting screen SCP4 (FIG. 22), the printer driver 170B determines (sets) the current driver setting displayed in the print setting screen SCP4 as the driver setting to be used for printing and the display controller 176 closes the display of the print setting screen SCP4.

Next, the printer driver 170B performs, based on a user operation, printing of the contents CON (Step S208). For example, when the operation part 130B receives a user operation to the button B1 in the edit screen SCE2 (FIG. 9), the print data creation part 177 of the printer driver 170B creates the print data of the contents CON based on the driver setting to be used for printing that has been set in the print setting screen SCP4 (FIG. 22). The transmission controller 178 of the printer driver 170B controls the communication part 110B to transmit the created print data to the image formation apparatus 200B. The image formation apparatus 200B performs the printing process based on the received print data, so as to form the image of the contents CON on the recording medium PM.

Next, the controller 150B terminates, based on a user operation, the application software 160 (Step S209).

This is the end of this flow.

(Reprinting Process in System 2B)

Figure 23:
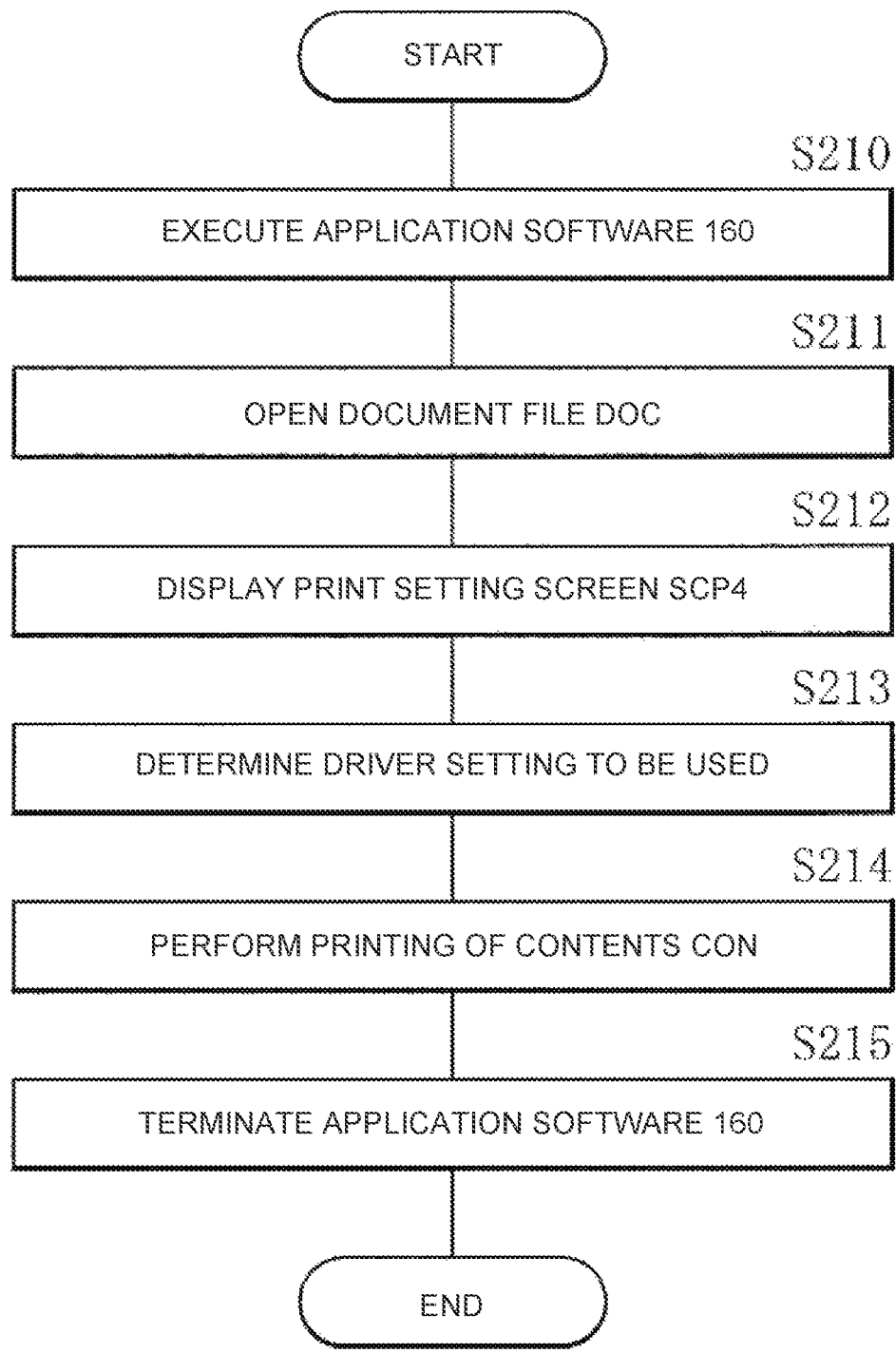
FIG. 23 is another flowchart illustrating an example of processing in the information processing apparatus such as being illustrated in FIG. 1.

FIG. 23 illustrates an operational example of a reprinting process. In the reprinting process, the information processing apparatus 100B preferentially displays the driver setting information DSR in the selection list LI1, and creates the print data based on the document file DOC and the driver setting information DSR. The process is described below in detail.

First, the controller 150B executes, based on a user operation, the application software 160 (Step S210).

Next, like Step S203 (FIG. 18), the application software 160 opens, based on a user operation, the document file DOC (Step S211). With this, the application software 160 displays the edit screen SCE2 (FIG. 9).

Next, the printer driver 170B displays, based on a user operation, the print setting screen SCP4 for setting the setting values of the driver setting information DSR (Step S212). For example, when the operation part 130B receives a user operation to the button B2 in the edit screen SCE2 (FIG. 9), the application software 160 calls (activates) the printer driver 170B. Then, the association information processing part 173 obtains from the application software 160 the association information RI in the document properties PR. Since the driver setting information DSR to be used for printing the document file DOC, which is identified by the association information RI obtained from the document file DOC, has been already registered in the printer driver 170B, the display controller 176 displays the print setting screen SCP4 (FIG. 22). That is, in the initial state in the reprinting process, the current driver setting of the printer driver 170B has been set based on the driver setting information DSR.

Next, the printer driver 170B determines, based on a user operation, the driver setting to be used for printing (Step S213). For example, when the operation part 130B receives a user operation to the switch SW1 in the print setting screen SCP4 (FIG. 22), the display controller 176 creates the selection list LI1 indicating one or more selectable options of driver setting information DSB, and preferentially displays the driver setting information DSR for the document file DOC, which is identified by the association information RI, among the one or more selectable options of driver setting information DSB in the selection list LI1.

Figure 24:
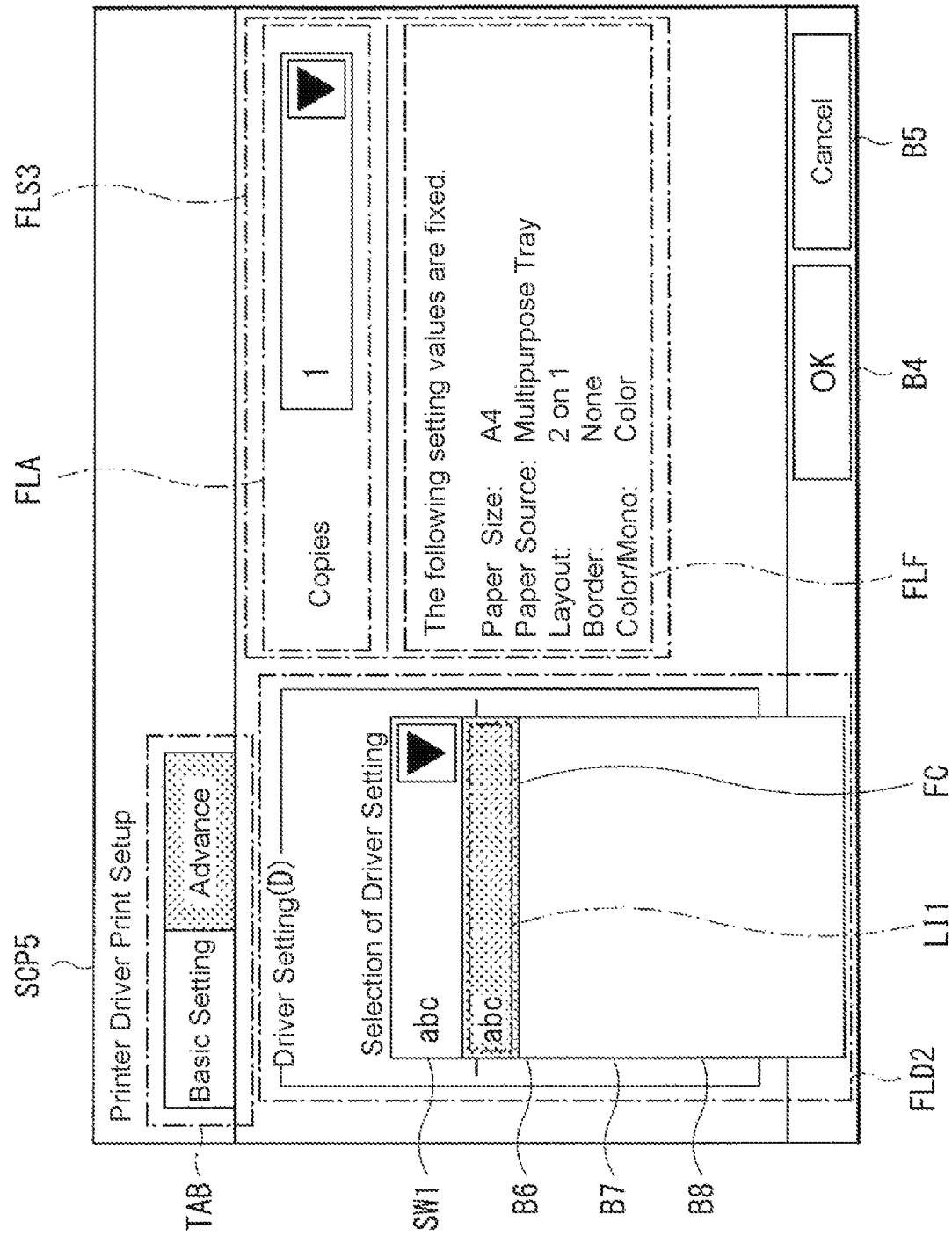
FIG. 24 is a diagram illustrating a view of an example of a display screen of the printer driver such as being illustrated in FIG. 2.

FIG. 24 illustrates an example of a print setting screen SCP5 including the selection list LI1. In the print setting screen SCP5, the selection list LI1 is displayed in the switch SW1 in the setting management field FLD2. In the selection list LI1, the driver setting information DSR is preferentially displayed with respect to the one or more selectable options of driver setting information DSB other than the driver setting information DSR. In the example illustrated in FIG. 24, "abc" which is the driver setting name of the driver setting information DSR is displayed. Note that the one or more selectable options of driver setting information DSB other than the driver setting information DSR may be specific examples of a "second preset information" in the disclosure. In the example illustrated in FIG. 24, only a single option of driver setting information DSB (the driver setting information DSR) is displayed in the selection list LI1. The operation part 130B receives user's selection operations in the selection list LI1. In the example illustrated in FIG. 24, "abc", which is the driver setting name of the driver setting information DSR, is selected and displayed as a focus FC, and thus the current driver setting of the printer driver 170B has been set based on the driver setting information DSR. With this, the driver setting retaining part 172 retains the setting values of the various print setting items included in the selected driver setting information DSR as the current driver setting of the printer driver 170B. When the operation part 130B receives a user operation to the variable setting field FLA, the setting values of each of one or more of the print setting items whose setting value is allowed to be change can be changed. In the example illustrated in FIG. 24, the user can change the setting value of the print setting item "Copies" through the variable setting field FLA. When the operation part 130B receives a user operation to the button B4, the printer driver 170B determines the current driver setting of the printer driver 170B as the driver setting to be used for printing and the display controller 176 closes the display of the screen.

Like step S208 (FIG. 18), the printer driver 170B performs printing of the contents CON based on a user operation (Step S214).

Next, the controller 150B terminates, based on a user operation, the application software 160 (Step S215).

This is the end of this flow.

In the distribution process, the printing process, and the reprinting process described above, the document file DOC is associated with the driver setting information DSR by means of the association information RI, as illustrated in FIG. 6. The driver setting information DSR includes the control information that indicates the driver setting information DSR is to be used "Only for this file" as illustrated in FIG. 17. That is, the driver setting information DSR includes the control information that indicates the driver setting information DSR is to be used only for the document file DOC. With this, when the application software 160 opens the document file DOC in the information processing apparatus 100B, the display controller 176 displays the selection list LI1 including the driver setting information DSR, as illustrated in FIG. 24.

On the other hand, when the application software 160 opens a document file DOC1 which is not associated with the driver setting information DSR, the display controller 176 displays a selection list that does not include the driver setting information DSR. For example, when the document file DOC1 is opened, the display controller 176 creates and displays the selection list LI1 that includes one or more selectable options of driver setting information DSB and that does not include the driver setting information DSR, because the driver setting information DSR includes the control information that indicates the driver setting information DSR is to be used only for the document file DOC and thus cannot be used for the document file DOC1.

Note that, the driver setting information DSR includes the control information indicating "Only for this file" in the example illustrated in FIG. 17; however, the driver setting information DSR may include the control information indicating "Not only for this file". In other words, the driver setting information DSR may include the control information indicating that the driver setting information DSR is to be used for the document file DOC and other documents other than the document file DOC. In this case, when the application software 160 in the information processing apparatus 100B opens the document file DOC, the display controller 176 creates the selection list LI1 including the driver setting information DSR as illustrated in FIG. 24. In the selection list LI1, the driver setting information DSR is preferentially displayed with respect to one or more options of driver setting information DSB other than the driver setting information DSR. On the other hand, when the application software 160 in the information processing apparatus 100B opens the document file DOC1, which is not associated with the driver setting information DSR, the display controller 176 also creates a selection list including the driver setting information DSR. However, in this selection list, the driver setting information DSR is not preferentially displayed with respect to one or more options of driver setting information DSB other than the driver setting information DSR. That is, since the document file DOC1 is not associated with the driver setting information DSR, the driver setting information DSR is not preferentially displayed.

As described above, in the image formation system 1, the information processing apparatus 100A transmits the document file DOC and the driver setting file DF to the information processing apparatus 100B, and the information processing apparatus 100B creates the print data based on the document file DOC and the driver setting file DF. With this, the information processing apparatus 100B can create the print data based on the driver setting information DSR0 created by and used in the information processing apparatus 100A. Therefore, in the image formation system 1, the system 2B can easily obtain the print result same as in the system 2A, so as to improve user convenience.

The information processing apparatus 100B in the image formation system 1 obtains the association information RI from the document file DOC including the association information RI identifying the driver setting information DSR. When displaying one or more options of driver setting information DSB including the driver setting information DSR, the information processing apparatus 100B preferentially displays, based on the obtained association information RI, the driver setting information DSR identified by the association information RI with respect to the one or more options of driver setting information DSB other than the driver setting information DSR. With this, in the image formation system 1, the user does not have trouble to select (does not hesitate to select) the driver setting information DSR. This can prevent misprints and improve user convenience.

Especially, in the image formation system 1, one or more options of driver setting information DSB displayed in the selection list LI1 include only one option of driver setting information DSB (that is, only the driver setting information DSR). Accordingly, in the image formation system 1, the driver setting information DSR associated with the association information RI is unconditionally selected, which can further improve the user convenience.

Further, as illustrated in FIGS. 14 and 17, the image formation system 1 enables to set whether or not permit changes of the setting value of each of the various print setting items included in the driver setting information DSR. Further, each of the print setting item(s) whose setting value(s) is allowed to be changed is displayed with the setting value being changeable, while each of the print setting item(s) whose setting value(s) is not allowed to be changed is displayed with the setting value being fixed (unchangeable), as illustrated in FIG. 22. That is, the user of the information processing apparatus 100A can set the printer driver setting that permits changes only on the print setting item(s) whose setting value(s) can be changed and does not permit changes on the print setting item(s) whose setting value(s) should not be changed. With this, the user of the information processing apparatus 100B can change the setting value(s) of only the print setting item(s) allowed by the user of the information processing apparatus 100A. Therefore, it is possible to reduce the risk that the print result become significantly different from the print result that the user of the information processing apparatus 100A expected. As a result, misprinting can be prevented and thus user convenience can be improved.

Further, the information processing apparatus 100B in the image formation system 1 obtains the driver setting information DSR based on the association information RI registered in the document file DOC, and sets the current driver setting of the printer driver 170B based on the obtained driver setting information DSR. With this, when the selection list LI1 is displayed, the current driver setting of the printer driver 170B is displayed. Accordingly, before the user performs a selection operation in the selection list LI1, the user can grasp the setting values of the driver setting information DSR. This can further improve user convenience.

Further, in the image formation system 1, the driver setting information DSR includes the control information indicating "Only for this file" or the control information indicating "Not only for this file". In the case where the driver setting information DSR includes the control information indicating "Only for this file", when the application software 160 opens the document file DOC which is associated with the driver setting information DSR, the display controller 176 creates the selection list LI1 including the driver setting information DSR. On the other hand, when the application software 160 opens the document file DOC1, which is not associated with the driver setting information DSR, the display controller 176 can create a selection list that does not include the driver setting information DSR. Since the selection list does not include the driver setting information DSR when the document file DOC1 is opened, it is possible to reduce the risk that the driver setting information that is unlikely to be used is displayed in the selection list. With this, the user does not have trouble to select the driver setting. This can prevent misprints and improve user convenience.

Effects

According to a first embodiment described above, the information processing apparatus 100A in the system 2A transmits the document file and the driver setting file to the information processing apparatus 100B in the system 2B, and the information processing apparatus 100B creates the print data based on the document file and the driver setting file. With this, the information processing apparatus 100B can create the print data based on the driver setting information DSR0 used in the information processing apparatus 100A. Accordingly, the system 2B can easily obtain the print result same as the print result in the system 2A. This can improve user convenience.

In a first embodiment described above, the information processing apparatus 100B in the system 2B obtains the association information based on the document file associated with the driver setting information DSR. Then, based on the obtained association information, the information processing apparatus 100B preferentially displays the driver setting information DSR identified by the association information with respect to one or more options of driver setting information DSB other than the driver setting information DSR. With this, the user of the information processing apparatus 100B does not have trouble (does not hesitate) to choose the driver setting information DSR. This can prevent misprinting and thus improve user convenience.

According to a first embodiment described above, one or more options of driver setting information displayed in the selection list includes only the driver setting information DSR. Accordingly, the driver setting information DSR associated with the association information RI is unconditionally selected, which can further improve the user convenience.

According to a first embodiment described above, the image formation system 1 can set whether or not allow changes of the setting value of each of the various print setting items included in the driver setting information DSR. And each of the print setting item(s) whose setting value(s) is allowed to be changed is displayed with the setting value being changeable, while each of the print setting item(s) whose setting value(s) is not allowed to be changed is displayed with the setting value being fixed (unchangeable). Accordingly, the setting value(s) of only the print setting item(s) whose setting value(s) are allowed to be changed by the user of the information processing apparatus 100A can be changed. Therefore, it is possible to reduce the risk that the print result becomes significantly different from the print result that the user of the information processing apparatus 100A expected. As a result, misprinting can be prevented and thus user convenience can be improved.

According to a first embodiment described above, the information processing apparatus 100B in the system 2A obtains the driver setting information DSR based on the association information RI registered in the document file DOC, and sets the current driver setting of the printer driver 170B based on the obtained driver setting information DSR. With this, before the user performs a selection operation in the selection list, the user can grasp the setting values of the driver setting information DSR. This can further improve user convenience.

According to a first embodiment described above, the driver setting information DSR includes the control information indicating "Only for this file" or the control information indicating "Not only for this file". Accordingly, when the document file DOC1, which is not associated with the driver setting information DSR is opened, the selection list does not include the driver setting information DSR. Therefore, it is possible to reduce the risk that the driver setting information that is unlikely to be used is displayed in the selection list. This can prevent the user from hesitating to select the driver setting, and thus can prevent misprints and improve user convenience.

[Modification 1-1]

In a first embodiment described above, the display controller 176 displays only a single option of driver setting information DSB (that is, the driver setting information DSR) in the selection list LI1, as illustrated in FIG. 24. However, an embodiment or a modification is not limited to this. For example, the display controller 176 may display the driver setting information DSR associated with the document file DOC by the association information RI with being highlighted with respect to one or more options of driver setting information DSB other than the driver setting information DSR. For example, the display controller 176 may emphasis the driver setting information DSR by changing the font or the color of the driver setting name of the driver setting information DSR.

Figure 25:
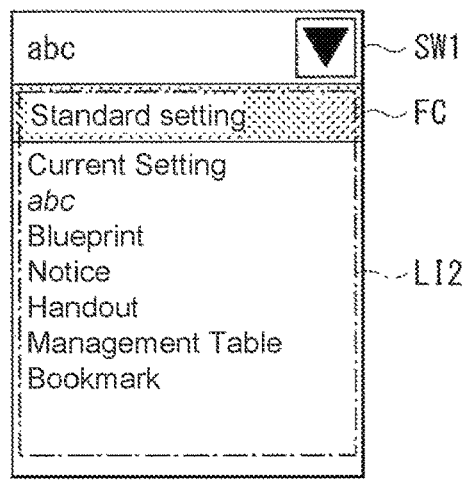
FIG. 25 is a diagram illustrating a view of a part of a display screen in an information processing apparatus according to a modification.

FIG. 25 illustrates an example of a selection list LI2 in the setting management field according to a modification. The selection list LI2 includes "Standard Setting", "Current Setting", "abc", "Blueprint", "Notice", "Handout", "Management Table", and "Bookmark", as options of driver setting information. "Standard Setting", "Current Setting", "abc", "Blueprint", "Notice", "Handout", "Management Table", and "Bookmark" are the driver setting names of the options of driver setting information DSB. The item "abc" is the driver setting name of the driver setting information DSR, which is one of the options of driver setting information DSB. In the example illustrated in FIG. 25, the display controller 176 displays, in the selection list LI2, the font of "abc", which is the driver setting name of the driver setting information DSR, is changed in italic different from the font of the other driver setting names. In the example illustrated in FIG. 25, the font of the driver setting name of the driver setting information DSR is changed in italic; however, is not limited to this. For example, the font of the driver setting name of the driver setting information DSR may be changed into bold type or into a font different from that of the driver setting name of the other options of driver setting information DSB. Even in this way, in the selection list LI2, the driver setting information DSR can be preferentially displayed with respect to the other options of driver setting information DSB other than the driver setting information DSR.

Further, for example, the display controller 176 may display one or more options of driver setting information DSB including the driver setting information DSR arranged in order from the driver setting information DSR.

Figure 26:
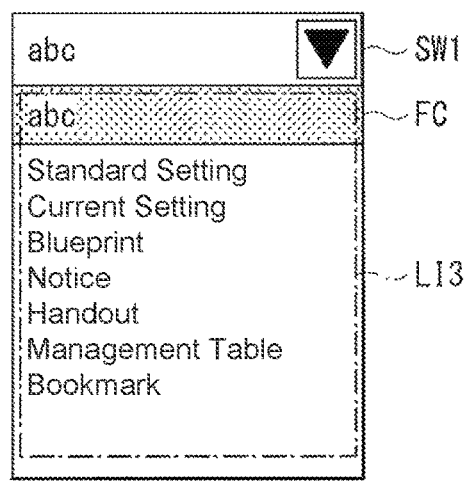
FIG. 26 is a diagram illustrating a view of a part of a display screen in an information processing apparatus according to another modification.

FIG. 26 illustrates an example of a selection list LI3 in the setting management field according to a modification. Like the selection list LI2, the selection list LI3 includes "abc", "Standard Setting", "Current Setting", "Blueprint", "Notice", "Handout", "Management Table", and "Bookmark". In the example illustrated in FIG. 26, the display controller 176 displays, in the selection list LI3, plural options of driver setting information DSB including the driver setting information DSR arranged in order from "abc", which is the driver setting name of the driver setting information DSR. Even in this way, the driver setting information DSR can be preferentially displayed in the selection list LI3. Further, in a modification, the display controller 176 may display plural options of driver setting information DSB including the driver setting information DSR arranged in order from the driver setting information DSR while the driver setting information DSR being highlighted over one or more options of driver setting information DSB other than the driver setting information DSR.

[Modification 1-2]

In a first embodiment described above, as illustrated in FIG. 24, the display controller 176 preferentially displays only one option of driver setting information DSB (that is, the driver setting information DSR) with respect to the other options of driver setting information DSB other than the driver setting information DSR among the plural options of driver setting information DSB. However, an embodiment or a modification is not limited to this. For example, the display controller 176 may preferentially display two or more options of driver setting information DSB (two or more options of driver setting information DSR) with respect to the other options of driver setting information DSB other the two or more options of driver setting information DSR.

Figure 27:
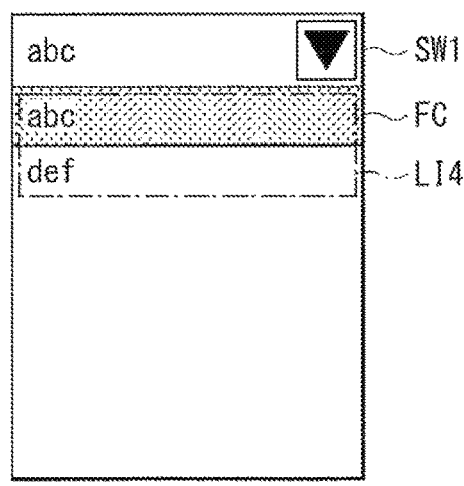
FIG. 27 is a diagram illustrating a view of a part of a display screen in an information processing apparatus according to another modification.

FIG. 27 illustrates an example of a selection list LI4 according to a modification. The selection list LI4 includes "abc" and "def". Each of "abc" and "def" is the driver setting name of the driver setting information DSR. In the example illustrated in FIG. 27, the display controller 176 preferentially displays "abc" and "def" with respect to the other options of driver setting information DSB other than the two options of driver setting information DSR ("abc" and "def") in the selection list LI4.

In this example, the information processing apparatus 100A transmits, to the information processing apparatus 100B, a driver setting file DF including the driver setting information DSR whose driver setting name is "abc" and another driver setting file DF including the driver setting information DSR whose driver setting name is "def". The information processing apparatus 100A also transmits, to the information processing apparatus 100B, the document file DOC that includes two options of driver setting information DSR and two options of association information RI (the association information RI1 and the association information RI2) respectively associated with the two options of driver setting information DSR. The information processing apparatus 100B receives the document file DOC and the two driver setting files DF and displays the selection list LI4 such as being illustrated in FIG. 27. Here, the driver setting information DSR whose driver setting name is "abc" may be a specific example of "first preset information" in the disclosure, and the driver setting information DSR whose driver setting name is "def" may be a specific example of "third preset information" in the disclosure. The association information RI1 may be a specific example of "first association information" and the association information RI2 may be a specific example of "second association information" in the disclosure.

[Modification 1-3]

In a first embodiment described above, the printer driver 170B reads out (imports) the driver setting file DF, based on a user operation, as shown in step S205 (FIG. 18). However, an embodiment or a modification is not limited to this. For example, in a case where the document file DOC and the driver setting file DF are stored in the same folder, the address of the driver setting file DF may be obtained with reference to the address of the document file DOC.

A printer driver according to this modification displays, based on a user operation to the button B2 in the edit screen SCE2 (FIG. 9), the print setting screen. At this time, the printer driver checks whether or not there is the driver setting file DF in the folder in which the document file DOC is stored, and then, when the driver setting file DF is stored in the folder in which the document file DOC is stored, sets the current driver setting of the driver based on the driver setting information DSR included in the driver setting file DF. In this way, even in the initial state of the print setting screen, the current driver setting has been set based on the driver setting file DF. With this, the printer driver according to this modification can import the driver setting file DF without user operations such as being illustrated in FIGS. 19 to 21. Therefore, the driver setting information DSR can be registered in the printer driver with a fewer number of operations. This can further improve user convenience.

2. Second Embodiment

Next, an image formation system 3 according to a second embodiment is described blow. Note that in a second embodiment, the substantially same components as in the image formation system 1 in a first embodiment described above are designated by the same reference numerals, and the descriptions thereof may be omitted to avoid redundancy.

Figure 28:
FIG. 28 is a diagram illustrating an explanatory view of a configuration example of an image formation system according to a second embodiment.

FIG. 28 illustrates a configurational example of an image formation system 3. The image formation system 3 includes an information processing apparatus 100C and an image formation apparatus 200C. The information processing apparatus 100C and the image formation apparatus 200C communicate with each other via, for example, a wired LAN, a wireless LAN, a USB, etc.

The information processing apparatus 100C may be a so-called personal computer, and is configured to execute various processes based on a user operation. For example, in the information processing apparatus 100C, an application software 160C and a printer driver 170C are installed. The information processing apparatus 100C executes the application software 160C to create a document file DOC which is data for an advertisement design and store the document file DOC, based on a user operation. The information processing apparatus 100C further executes, based on a user operation in the application software 160C, the printer driver 170C to create print data based on the document file DOC and the driver setting information DSR0. The information processing apparatus 100C transmits the created print data to the image formation apparatus 200C. The information processing apparatus 100C registers, to the document properties PR, the association information RI indicating that the document file DOC is associated with the driver setting information DSR0, based on a user operation.

The image formation apparatus 200C is, for example, a printer. The image formation apparatus 200C is configured, based on the print data transmitted from the information processing apparatus 100C, to perform an image formation operation using a developer to form a monochrome or color image on a recording medium PM. The image formation apparatus 200C transmits a print completion notification to the information processing apparatus 100C when the image formation operation is completed.

In the image formation system 3, the information processing apparatus 100C executes, based on a user operation, the application software 160C, to create the document file DOC and store the created document file DOC. The information processing apparatus 100C executes, based on a user operation in the application software 160C, the printer driver 170C to register the driver setting information DSR0 to the printer driver 170C. The information processing apparatus 100C creates, based on a user operation, the print data. The image formation apparatus 200C performs the image formation operation based on the print data to form the image of the advertisement design on the recording medium PM. Then, the information processing apparatus 100C associates, based on a user operation, the document file DOC and the driver setting information DSR0. After that, when the user wants to reprint based on the document file DOC, the information processing apparatus 100C executes again, based on a user operation, the application software 160C to open the document file DOC. The information processing apparatus 100C executes, based on a user operation in the application software 160C, the printer driver 170C so as to display the print setting screen SCP for setting the print setting. The information processing apparatus 100C creates, based on a user operation on the print setting screen SCP, a selection list LI5 indicating one or more selectable options of driver setting information and preferentially displays the driver setting information DSR0 in the selection list LI5. The information processing apparatus 100C selects, based on a user operation on the print setting screen SCP, the driver setting information DSR0 from the selection list LI5. The information processing apparatus 100C creates the print data based on the document file DOC and the driver setting information DSR0. Then, the image formation apparatus 200C performs the image formation operation based on the print data, so as to form the image of the advertisement design on the recording medium PM. In this way, in the image formation system 3 preferentially displays the driver setting information DSR0 associated with the document file DOC in the selection list LI5. Therefore, user convenience can be improved.

Figure 29:
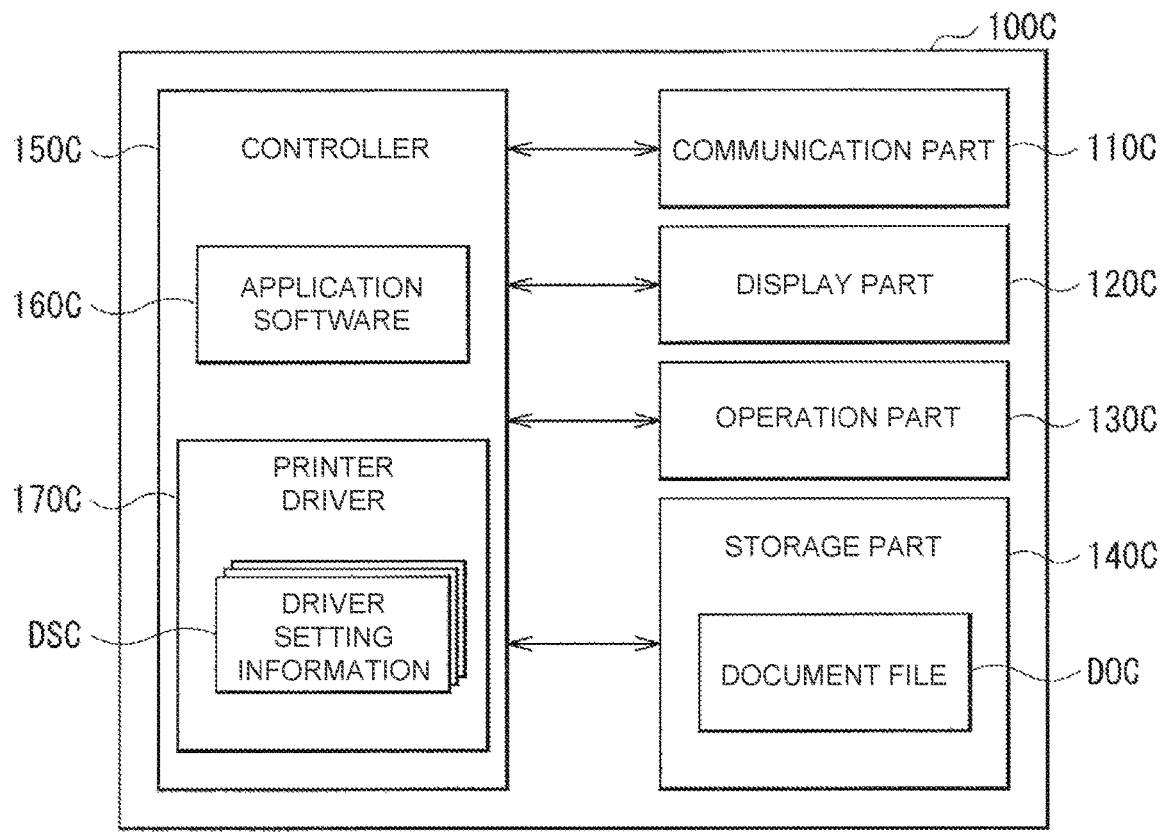
FIG. 29 is a block diagram illustrating a view of a configuration example of an information processing apparatus such as being illustrated in FIG. 28.

FIG. 29 illustrates a configurational example of the information processing apparatus 100C. The information processing apparatus 100C includes a communication part 110C, a display part 120C, an operation part 130C, a storage part 140C, and a controller 150C. The communication part 110C is configured to communicate with the image formation apparatus 200C. For example, the communication part 110C transmits the print data to the image formation apparatus 200C. The communication part 110C receives the print completion notification transmitted from the image formation apparatus 200C. The display part 120C is, for example, an LCD and is configured to display contents of processes performed or to be performed by the controller 150C. The operation part 130C is configured to receive operations of a user. The storage part 140C is configured to store therein various data including various programs, various settings, and/or the like. The storage part 140C stores therein the document file DOC. The document file DOC is created by the application software 160C and stored in the storage part 140C. The controller 150C is configured to execute one or more of various programs, to perform operations based on the executed program(s). The controller 150C can execute the application software 160C and the printer driver 170C stored in the storage part 140C.

The application software 160C is a program to execute a specific process. For example, the application software 160C edits data of an advertisement design and stores the edit data as the document file DOC, based on a user operation.

The printer driver 170C is a so-called device driver that controls operations of the image formation apparatus 200C. The printer driver 170C is configured to create the print data. In the printer driver 170C, plural pieces (plural options) of driver setting information DSC are registered. Each piece (option) of driver setting information DSC is data including setting values of various print setting items. The printer driver 170C selects, based on user's selection operations, one of the plural pieces (options) of driver setting information DSC and sets, based on the selected driver setting information DSC, the setting of the various print setting items.

Figure 30:
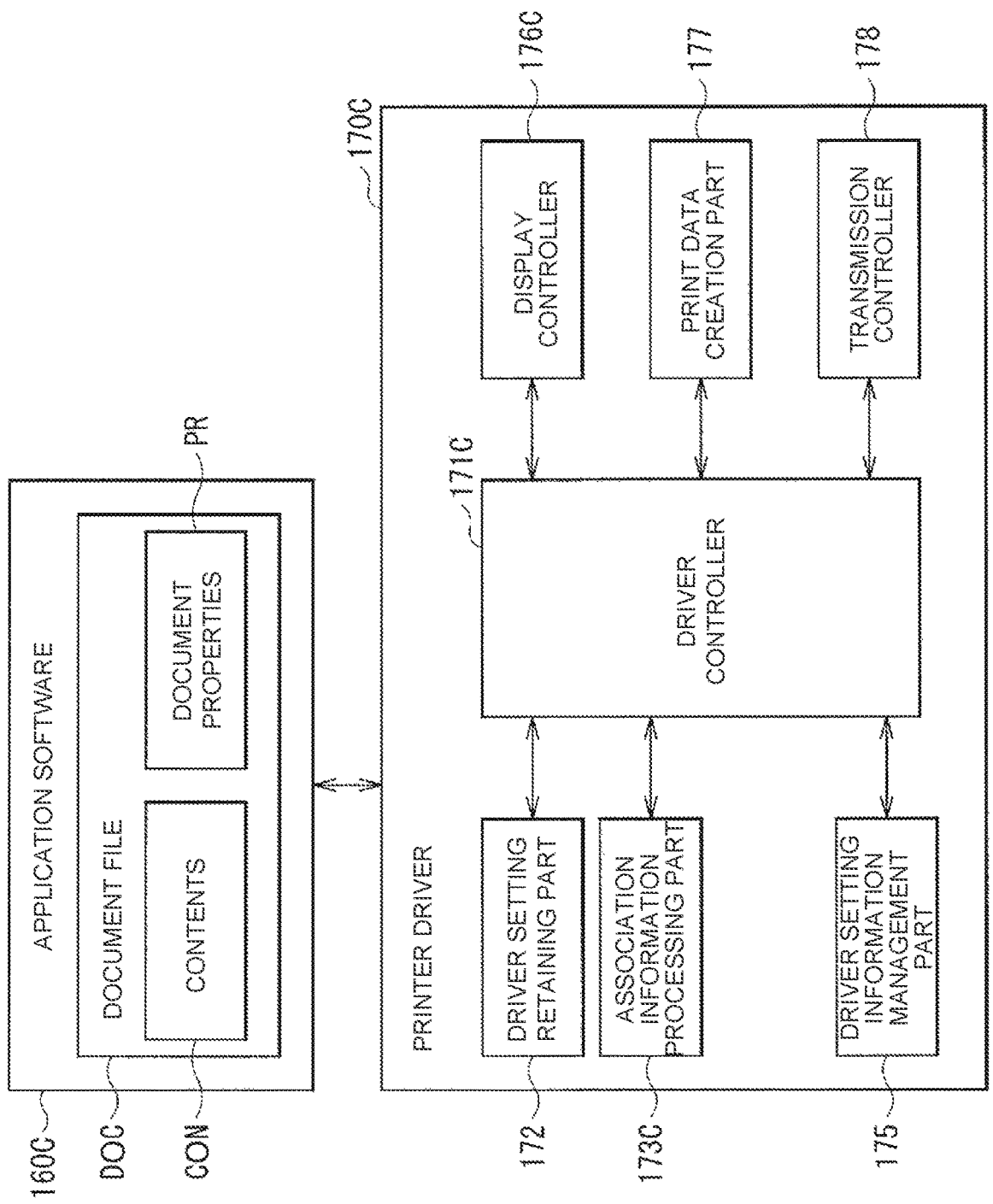
FIG. 30 is a block diagram illustrating a view of a configuration example of software in the information processing apparatus such as being illustrated in FIG. 28.

FIG. 30 illustrates a configurational example of the application software 160C and the printer driver 170C of the information processing apparatus 100C.

The printer driver 170C includes a driver controller 171C, a driver setting retaining part 172, an association information processing part 173C, a driver setting information management part 175, a display controller 176C, the print data creation part 177, and a transmission controller 178.

The driver controller 171C is configured to control, based on a user operation, the driver setting retaining part 172, the association information processing part 173C, the driver setting information management part 175, the display controller 176C, the print data creation part 177, and the transmission controller 178, so as to control an overall operation of the printer driver 170C.

The association information processing part 173C is configured, based on the instructions from the driver controller 171C, to process the document properties PR. For example, the association information processing part 173C is configured to obtain, from the application software 160C, the association information RI in the document properties PR. The association information processing part 173C is also configured to register the association information RI to the document properties PR of the document file DOC.

The display controller 176C is configured, based on instructions from the driver controller 171C, display various user interface screens for the print setting.

Here, the driver setting information DSR0 may be a specific example of "first preset information" of the disclosure. The plural pieces (options) of driver setting information DSC are specific examples of "plural pieces of preset information" in the disclosure. The print data creation part 177 may be a specific example of a "data creation part" in the disclosure. The association information processing part 173C may be a specific example of a "registration part" in the disclosure.

Hereinafter, a printing process and a reprinting process based on the document file DOC and the driver setting information DSR0 in the image formation system 3 are described in detail.

(Printing Process)

Figure 31:
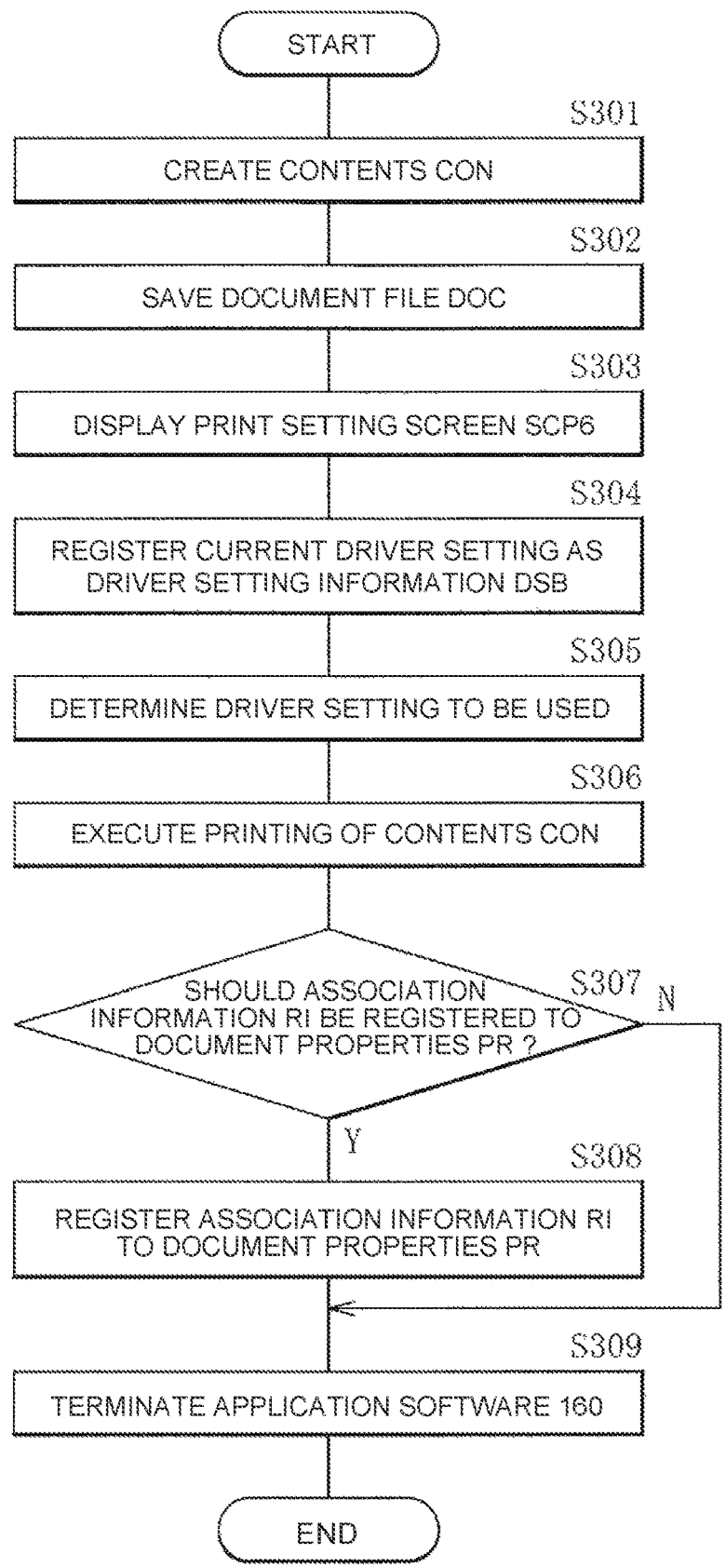
FIG. 31 is a flowchart illustrating an example of processing in the information processing apparatus such as being illustrated in FIG. 28.

FIG. 31 illustrates an example of the printing process. In the printing process, the information processing apparatus 100C creates the document file DOC, creates the print data based on the document file DOC and the driver setting information DSR0, and associates the document file DOC and the driver setting information DSR0. For example, when the controller 150C executes, based on a user operation, the application software 160C, the printing process is started. The process is described below in detail.

First, the application software 160C creates, based on a user operation, the contents CON (Step S301). For example, the application software 160C creates, based on a user operation, the contents CON by performing drawing processing of characters and graphics, image data retrieving processing, and/or the like. In response to this, the application software 160C displays an edit screen SCE3 for editing the contents CON.

Figure 32:
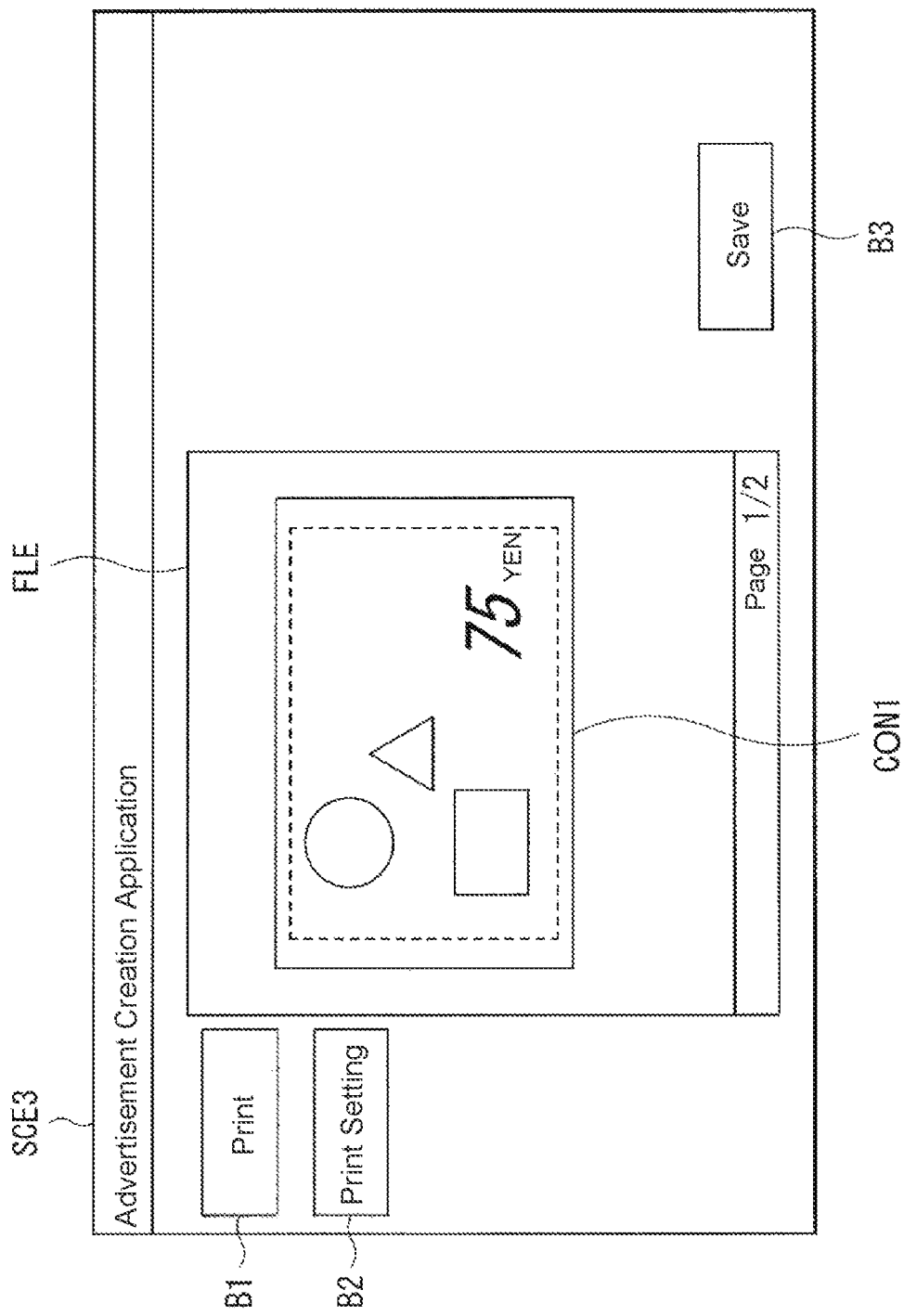
FIG. 32 is a diagram illustrating a view of an example of a display screen of application software such as being illustrated in FIG. 29.

FIG. 32 illustrates an example of the edit screen SCE3. The edit screen SCE3 includes the edit field FLE and the buttons B1 to B3.

Next, the application software 160C stores, based on a user operation, the document file DOC to the storage part 140C (Step S302). For example, when the operation part 130C receives a user operation to the button B3 in the edit screen SCE3, the application software 160C stores the created contents CON as the document file DOC to the storage part 140C.

Next, the printer driver 170C displays, based on a user operation, a print setting screen SCP6 for setting the print setting (Step S303). For example, when the operation part 130C receives a user operation to the button B2 in the edit screen SCE3 (FIG. 32), the application software 160C calls (activates) the printer driver 170C so that the display controller 176C displays the print setting screen SCP6.

Figure 33:
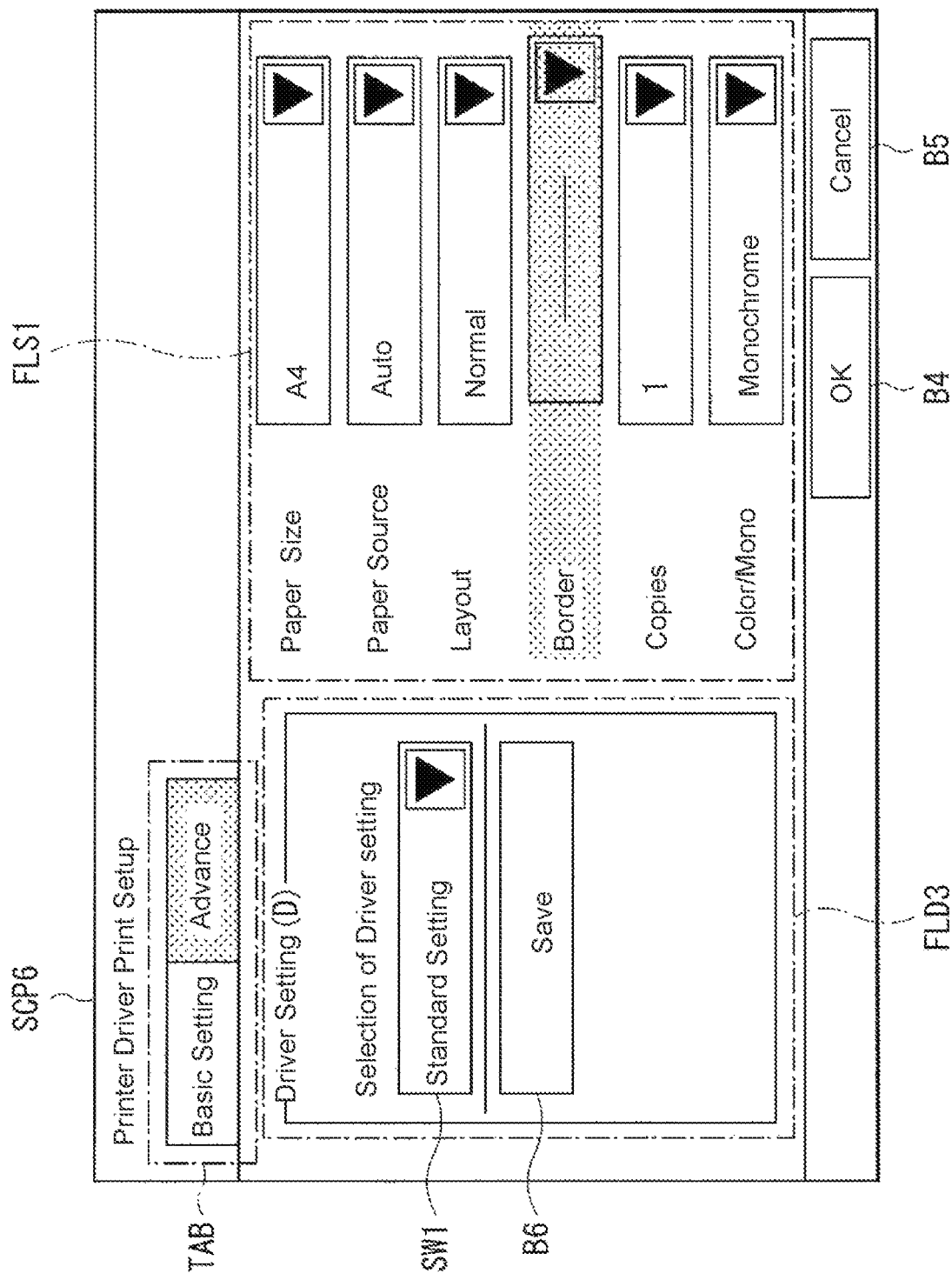
FIG. 33 is a diagram illustrating a view of an example of a display screen of a printer driver such as being illustrated in FIG. 29.

FIG. 33 illustrates an example of the print setting screen SCP6. The print setting screen SCP6 includes the switching tab TAB, the buttons B4 and B5, the setting field FLS1, and a setting management field FLD3. The setting management field FLD3 includes the switch SW1 and the button B6.

Next, the printer driver 170C registers, based on a user operation, the current driver setting as one piece (option) of the driver setting information DSC (Step S304). For example, when the operation part 130C receives a user operation to the setting field FLS1 in the print setting screen SCP6, the current driver setting is changed in the setting field FLS1. Then, when the operation part 130C receives a user operation to the button B6, the driver setting information management part 175 registers the current driver setting as one piece (option) of driver setting information DSC to the printer driver 170C. In the example illustrated in FIG. 33, the driver setting name of the registered option of driver setting information DSC is "abc", and the registered option of driver setting information DSC is the driver setting information DSR0 associated with the document file DOC.

Next, the printer driver 170C determines (selects), based on a user operation, one of the driver setting to be used (Step S305). For example, the operation part 130C receives a user operation to the button B4, the display controller 176C closes the display of the print setting screen and the printer driver 170C determines that the current driver setting is the driver setting to be used for printing.

Next, the printer driver 170C executes, based on a user operation, printing the contents CON (Step S306). For example, when the operation part 130C receives a user operation to the button B1 in the edit screen SCE3 (FIG. 32), the print data creation part 177 creates the print data for the contents CON based on the print setting to be used for printing. The transmission controller 178 controls the communication part 110C to transmit the print date to the image formation apparatus 200C. The image formation apparatus 200C performs the image formation operation based on the print data, so as to form the image of the contents CON on the recording medium PM. Then, the image formation apparatus 200C transmits the print completion notification to the communication part 110C.

Next, the printer driver 170C determines, based on the print completion notification, whether or not the association information RI should be registered to the document properties PR (Step S307). For example, the display controller 176C displays, based on the print completion notification obtained through the communication part 110C, the association screen SCL1 to associate the document file DOC and the driver setting information DSR0.

Figure 34:
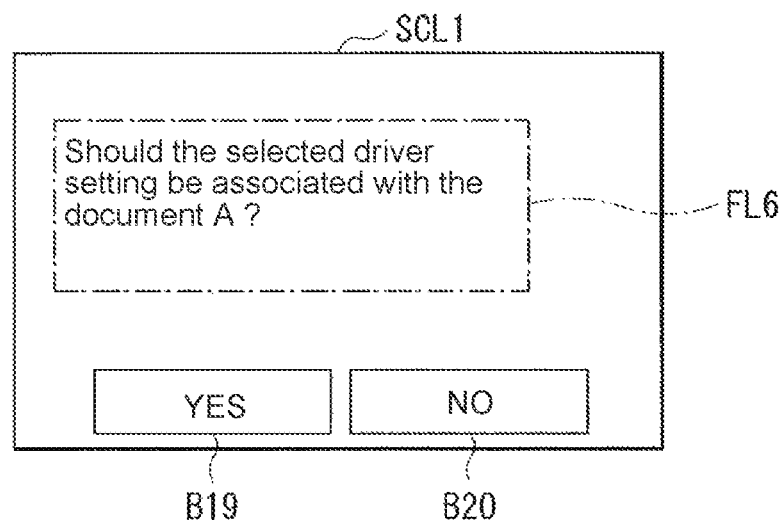
FIG. 34 is a diagram illustrating a view of an example of a display screen of the printer driver such as being illustrated in FIG. 29.

FIG. 34 illustrates an example of the association screen SCL1. The association screen SCL1 includes a field FL6 and buttons B19 and B20. The field FL6 is a field that prompts the user to determine whether the document file DOC should be associated with the driver setting information DSR0 registered in Step S304. The button B19 is a button to decide to associate the document file DOC with the driver setting information DSR0. The button B20 is a button to cancel the association of the document file DOC with the driver setting information DSR0.

When the operation part 130C receives a user operation to the association screen SCL1, the printer driver 170C determines whether or not the document properties PR is associated with the association information RI. When the printer driver 170C does not register the association information RI to the document properties PR ("N" in Step S307), the process proceeds to Step S309. When the printer driver 170C registers the association information RI to the document properties PR ("Y" in Step S307), the printer driver 170C registers, based on user operation, the association information RI to the document properties PR (Step S308). For example, the association information processing part 173C registers the association information RI to the document properties PR of the document file DOC.

Figure 35:
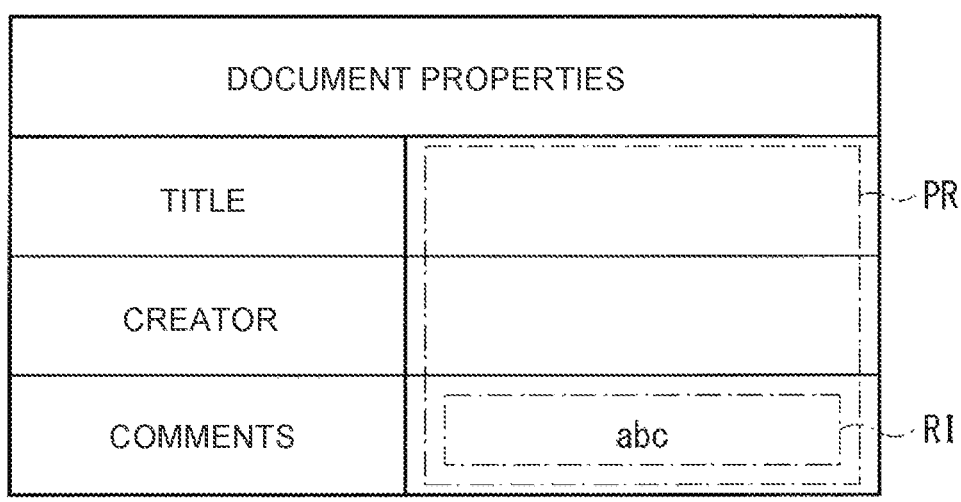
FIG. 35 is a diagram illustrating an explanatory view of an example of document properties such as being illustrated in FIG. 30.

FIG. 35 illustrates an example of the document properties PR of the document file DOC. In the example illustrated in FIG. 35, "abc" is registered in the comment field in the document properties PR. Here, "abc" is the association information RI, which indicates that the document file DOC is associated with the driver setting information DSR0 whose driver setting name is "abc".

Next, the controller 150C terminates, based on a user operation, the application software 160C (Step S309).

(Reprinting Process)

Figure 36:
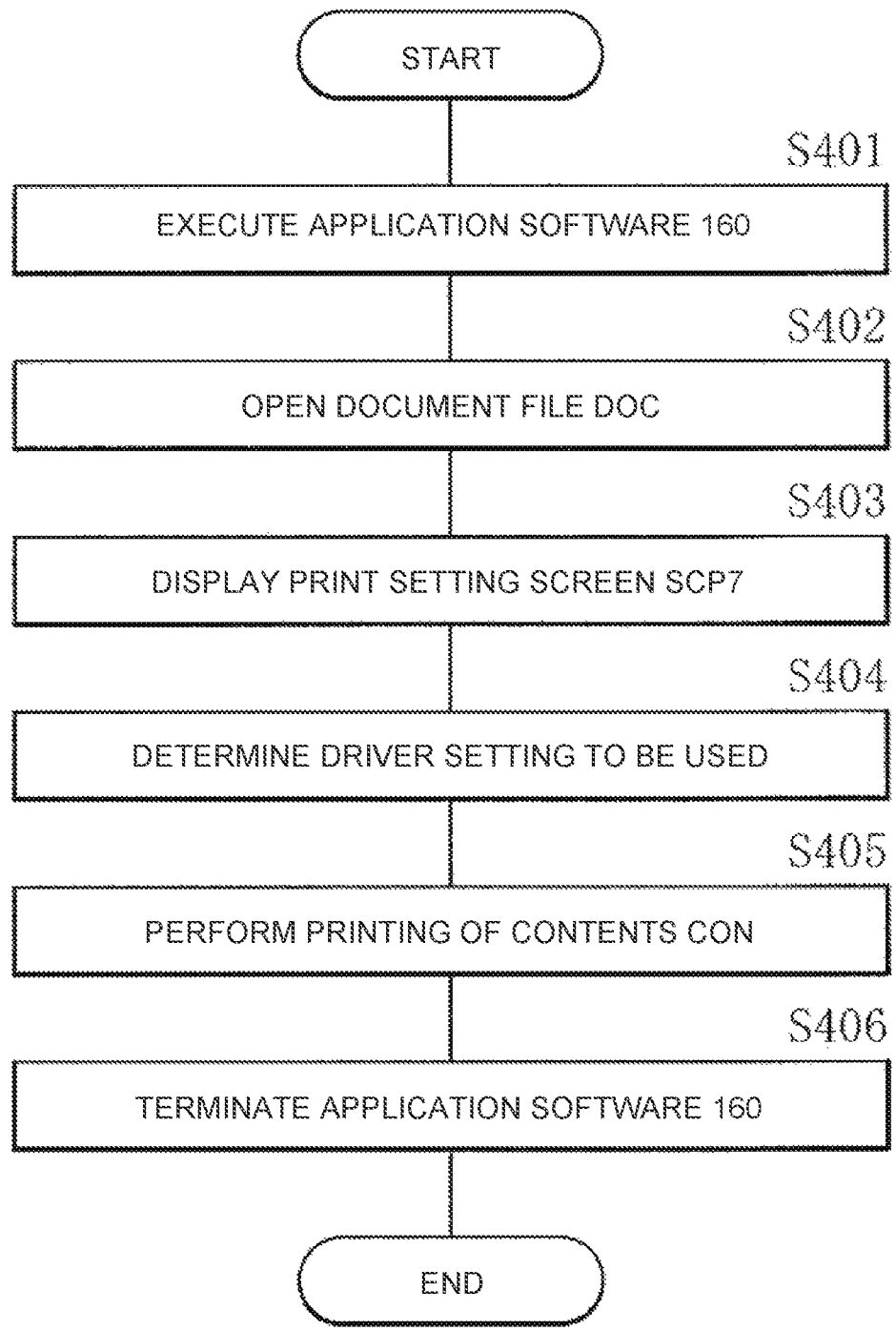
FIG. 36 is a flowchart illustrating an example of processing in the information processing apparatus such as being illustrated in FIG. 28.

FIG. 36 illustrates an example of the reprinting process. In the reprinting process, the information processing apparatus 100C preferentially displays the driver setting information DSR0 in the selection list LI5 and creates the print data based on the document file DOC and the driver setting information DSR0. Hereinafter, this operation is described in detail.

First, the controller 150C executes, based on a user operation, the application software 160C (Step S401).

Next, the application software 160C opens, based on a user operation, the document file DOC (Step S402). For example, the application software 160C obtains, based on a user operation, the contents CON and the document properties PR of the document file DOC. In response to this, the application software 160C displays the edit screen SCE3 (FIG. 32).

Next, the printer driver 170C displays, based on a user operation, a print setting screen SCP7 in which the driver setting information DSR0 has been selected (Step S403). For example, when the operation part 130C receives a user operation to the button B2 in the edit screen SCE3 (FIG. 32), the application software 160C calls (activates) the printer driver 170C. The association information processing part 173C obtains, from the application software 160C, the association information RI in the document properties PR. Since the driver setting information DSR0, which is associated with the document file DOC by the association information RI, is registered in the printer driver 170C, the display controller 176C displays the print setting screen SCP7. That is, in the initial state, the current driver setting has been set based on the driver setting information DSR0.

Figure 37:
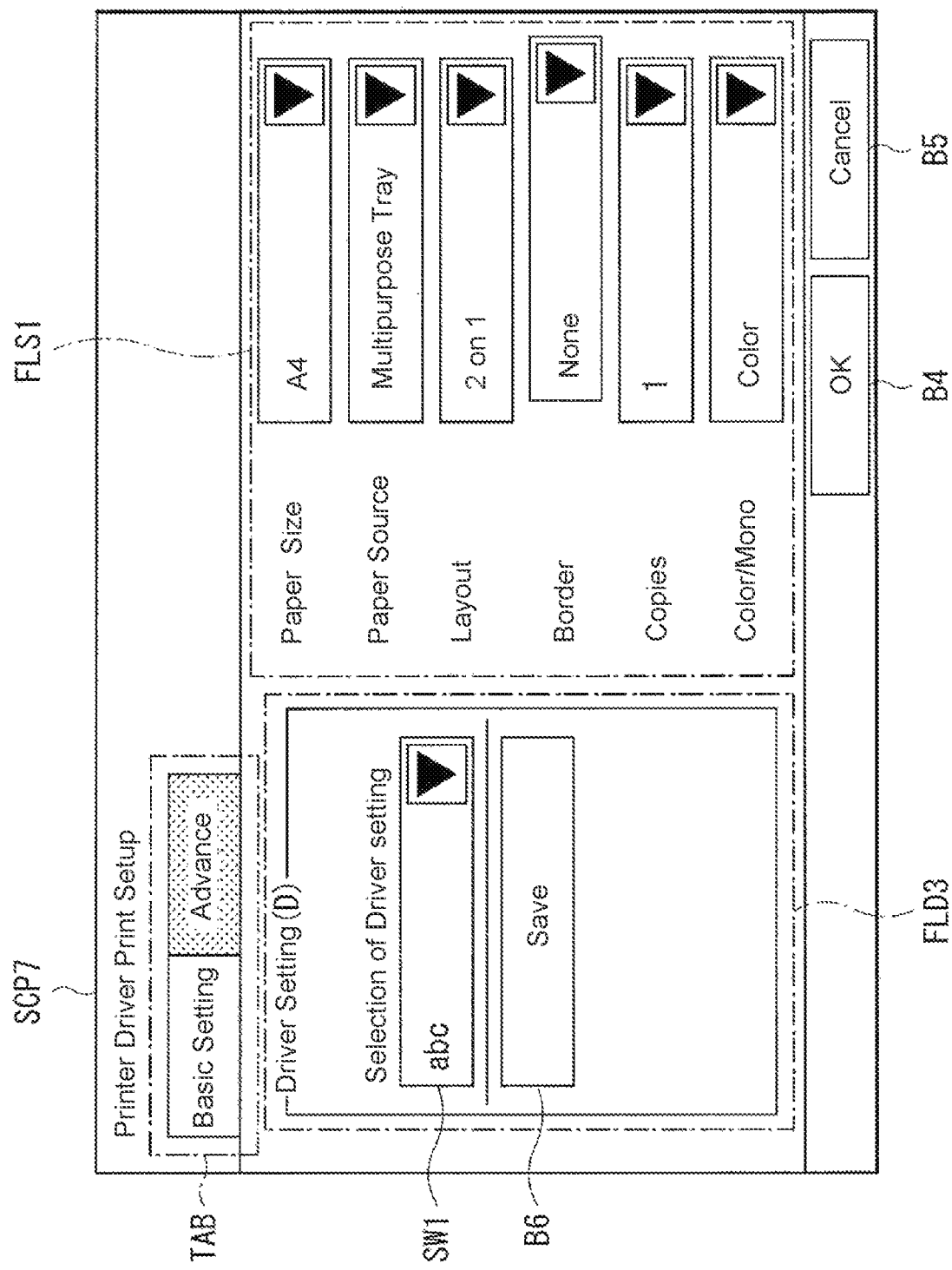
FIG. 37 is a diagram illustrating a view of an example of a display screen of the printer driver such as being illustrated in FIG. 29.

FIG. 37 illustrates an example of the print setting screen SCP7. In the switch SW1 in the setting management field FLD3, the driver setting name of the driver setting information DSR0 is displayed.

Next, the printer driver 170C determines, based on a user operation, the driver setting to be used for printing (Step S404). For example, when the operation part 130C receives a user operation to the switch SW1 in the print setting screen SCP7, the display controller 176C creates the selection list LI5 indicating one or more selectable options of driver setting information DSC, and preferentially displays, in the selection list LI5, the driver setting information DSR0, which is associated with the document file DOC by the association information RI, among the one or more options of driver setting information DSC.

Figure 38:
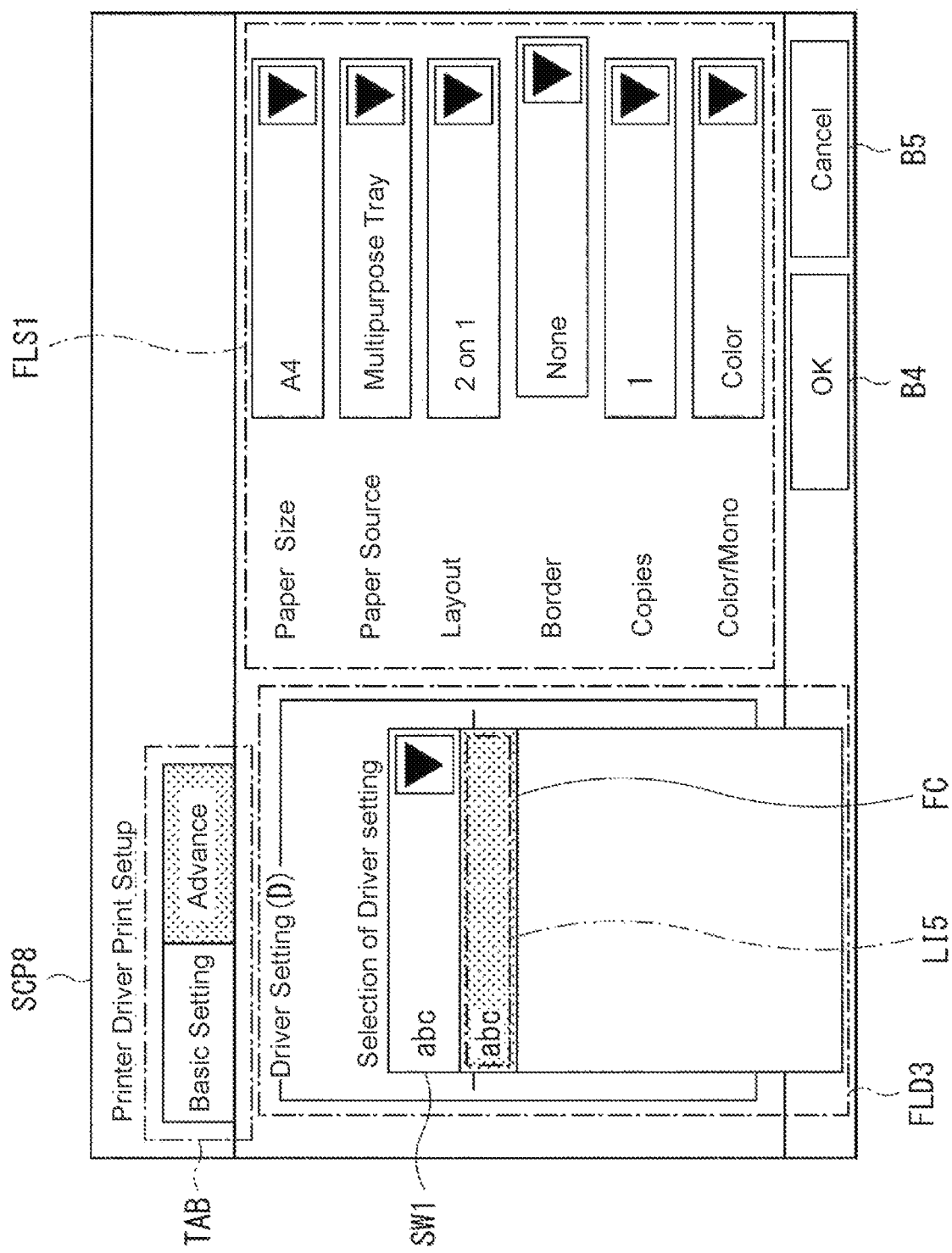
FIG. 38 is a diagram illustrating a view of an example of a display screen of the printer driver such as being illustrated in FIG. 29.

FIG. 38 illustrates an example of a print setting screen SCP8 including the selection list LI5. In the selection list LI5, the driver setting information DSR0 is preferentially displayed with respect to the one or more options of driver setting information DSC other than the driver setting information DSR0. In this example, "abc", which is the driver setting name of the driver setting information DSR0, is displayed. In the example illustrated in FIG. 38, in the selection list LI5, only one option of driver setting information DSC (that is, the driver setting information DSR0) is displayed. The operation part 130C receives user's selection operations with respect to the selection list LI5. In the example illustrated in FIG. 38, "abc", which is the driver setting name of the driver setting information DSR0 is selected as displayed as the focus FC, and the current driver setting is set based on the driver setting information DSR0. With this, the driver setting retaining part 172 retains, as the current driver setting. the various setting values included in the selected driver setting information DSR0. Then, when the operation part 130C receives a user operation to the button B4, the display controller 176C closes the display of this screen and the printer driver 170C determines the current driver setting as the driver setting to be used for printing.

Next, like Step S306 (FIG. 31), the printer driver 170C performs, based on a user operation, printing of the contents CON (Step S405).

Next, the controller 150C terminates, based on a user operation, the application software 160C (Step S406).

This is the end of this flow.

In this way, in the image formation system 3, after the print data creation part 177 creates the print data based on the driver setting information DSR0 and the document file DOC, the association information processing part 173C registers, to the document file DOC, the association information RI associated with the driver setting information DSR0, which is used when the print data is created. With this, the document file DOC can be associated with the driver setting information DSR0 with fewer numbers of user operations. Therefore, user convenience can be improved.

As described above, in a second embodiment, after the print data creation part creates the print data based on the driver setting information DSR0 and the document file, the association information associated with the driver setting information DSR0, which is used when the print data is created, is registered to the document file. Therefore, the document file can be associated with the driver setting information DSR0 with fewer numbers of user operations.

This can improve user convenience. Other effects of a second embodiment are the same as or similar to those of a first embodiment.

[Modification 2-1]

Modifications 1-1 and 1-2 of a first embodiment described above may be applied to the image formation system 3 according to a second embodiment.

[Other Modifications]

Further, two or more of the modifications described above may be combined.

Although the technology has been described above with reference to embodiments and modifications described above, the technology is not limited to these embodiments and modifications, and various modifications or alternations are possible.

For example, in embodiments or modifications described above, the application software is configured to edit data for an advertisement design; however, the invention is not limited to this. For example, the application software may deal with any data, for example, data other than an advertisement design such as a presentation document or the like.

Further, in embodiments or modifications described above, the association information RI is registered in the comment field in the document properties PR. However, the invention is not limited to this. For example, the document properties PR may be registered in another section such as the title field or the like.

For example, in a first embodiment described above, the driver setting information DSR including the driver setting information DSR0 and the control information CI is supplied to the information processing apparatus 1006. However, an embodiment or a modification is not limited to this. For example, like a second embodiment described above, only the driver setting information DSR0 may be supplied to the information processing apparatus 1006. Even in this case, the driver setting information DSR0 can be preferentially displayed with respect to the options of driver setting information DSC other than the driver setting information DSR0.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A method of displaying preset information, comprising:
    storing plural pieces of preset information including first preset information, wherein each of the plural pieces of preset information comprises setting information comprising setting values of setting items for processing a file;
    obtaining, from a target file that is to be processed and includes first association information associated with the first preset information and registered in attribution information of the target file, the first association information; and
    upon processing the target file, displaying one or more pieces of preset information out of the stored plural pieces of preset information, wherein
    displaying one or more pieces of preset information comprises
        the stored plural pieces of preset information comprises displaying, based on the obtained first association information, the first preset information associated with the first association information while displaying setting items of the first preset information and setting values of the setting items of the first preset information,
    the displayed setting items comprise one or more first setting items for which the setting value is permitted to change and one or more second setting items for which the setting value is not permitted to change, such that the one or more first setting items and the one or more second setting items are concurrently displayed, and
    the one or more first setting items for which the setting value is permitted to change and the one or more second setting items for which the setting value is not permitted to change are concurrently displayed while displaying a message indicating the setting values of the one or more second setting items are not permitted to change.

2. The method according to claim 1, wherein
displaying one or more pieces of preset information comprises preferentially displaying the first preset information associated with the first association information with respect to second preset information included in the stored plural pieces of preset information by displaying the first preset information associated with the first association information with emphasis over the second preset information.

3. The method according to claim 1, wherein
displaying one or more pieces of preset information comprises displaying the one or more pieces of preset information arranged in order from the first preset information associated with the first association information.

4. The method according to claim 1, wherein
the one or more pieces of preset information comprises only a single piece of preset information, which is the first preset information.

5. The method according to claim 1, wherein
the plural pieces of preset information further comprise second preset information and third preset information in addition to the first preset information,
the target file has second association information associated with the third preset information stored in addition to the first association information,
obtaining the first association information comprises obtaining the second association information in addition to the first association information from the target file, and
displaying one or more pieces of preset information comprises displaying the one or more pieces of preset information out of the plural pieces of preset information that are stored, preferentially displaying, based on the obtained first association information, the first preset information associated with the first association information with respect to the second preset information and preferentially displaying, based on the obtained second association information, the third preset information associated with the second association information with respect to the second preset information.

6. The method according to claim 1, wherein
displaying the first preset information associated with the first association information comprises preferentially displaying the first preset information associated with the first association information over second preset information included in the stored plural pieces of preset information.

7. The method according to claim 1, wherein
the one or more first setting items for which the setting value is permitted to change and the one or more second setting items for which the setting value is not permitted to change are concurrently displayed in a setting screen.

8. The method according to claim 1, wherein
a first field that displays therein the one or more first setting items for which the setting value is permitted to change and a second field that displays therein the one or more second setting items for which the setting value is not permitted to change are separately displayed at the same time.

9. A method of displaying preset information, comprising:
storing plural pieces of preset information including first preset information and second preset information;
obtaining, from a target file that is to be processed and includes first association information associated with the first preset information, the first association information; and
upon processing the target file, displaying one or more pieces of preset information out of the stored plural pieces of preset information, while preferentially displaying, based on the obtained first association information, the first preset information associated with the first association information over the second preset information, wherein
the first preset information comprises flag information which comprises one of a first value and a second value, and
the method further comprising:
upon processing another target file that does not include the first association information associated with the first preset information,
(i) displaying one or more pieces of preset information out of the stored plural pieces of preset information with the first preset information being not included in the displayed one or more pieces of preset information, in a case where the flag information of the first preset information comprises the first value, and
(ii) displaying one or more pieces of preset information out of the stored plural pieces of preset information with the first preset information being included in the displayed one or more pieces of preset information, in a case where the flag information of the first preset information comprises the second value.

10. An information processing apparatus comprising:
a storage part that stores therein plural pieces of preset information including first preset information, wherein each of the plural pieces of preset information comprises setting information comprising setting values of setting items for processing a file;
an acquisition part that obtains, from a target file that is to be processed and includes first association information associated with the first preset information and registered in attribution information of the target file, the first association information; and
a display controller that displays, when displaying one or more pieces of preset information out of the stored plural pieces of preset information upon processing the target file, based on the first association information obtained by the acquisition part, the first preset information associated with the first association information while displaying setting items of the first preset information and setting values of the setting items of the first preset information, wherein the displayed setting items include one or more first setting items for which the setting value is permitted to change and one or more second setting items for which the setting value is not permitted to change, such that the one or more first setting items and the one or more second setting items are concurrently displayed, and
the one or more first setting items for which the setting value is permitted to change and the one or more second setting items for which the setting value is not permitted to change are concurrently displayed while displaying a message indicating the setting values of the one or more second setting items are not permitted to change.

11. The information processing apparatus according to claim 10, wherein
the display controller preferentially displays the first preset information associated with the first association information with respect to second preset information included in the stored plural pieces of preset information by displaying the first preset information with emphasis over the second preset information.

12. The information processing apparatus according to claim 10, wherein
the display controller displays the one or more pieces of preset information arranged in order from the first preset information associated with the first association information.

13. The information processing apparatus according to claim 10, wherein
the one or more pieces of preset information comprises only a single piece of preset information, which is the first preset information.

14. The information processing apparatus according to claim 10, wherein
the plural pieces of preset information further comprise second preset information and third preset information in addition to the first preset information,
the target file has second association information associated with the third preset information stored in addition to the first association information,
the acquisition part further obtains the second association information in addition to the first association information from the target file, and
the display controller displays the one or more pieces of preset information out of the stored plural pieces of preset information, while preferentially displaying, based on the obtained first and second association information, the third preset information associated with the second association information in addition to the first preset information associated with the first association information with respect to the second preset information.

15. The information processing apparatus according to claim 10, further comprising
a data creation part that creates print data based on the first preset information and the target file; and
a registration part that registers, after the data creation part creates the print data, the first association information associated with the first preset information which is used to create the print data, to the target file.

16. The information processing apparatus according to claim 10, wherein
the first preset information associated with the first association information is preferentially displayed over second preset information included in the stored plural pieces of preset information.

17. The information processing apparatus according to claim 10, wherein
the one or more first setting items for which the setting value is permitted to change and the one or more second setting items for which the setting value is not permitted to change are concurrently displayed in a setting screen.

18. The information processing apparatus according to claim 10, wherein
a first field that displays therein the one or more first setting items for which the setting value is permitted to change and a second field that displays therein the one or more second setting items for which the setting value is not permitted to change are separately displayed at the same time.

19. The information processing apparatus according to claim 10, wherein
the display controller that preferentially displays, when displaying one or more pieces of preset information out of the stored plural pieces of preset information upon processing the target file, a name of the first preset information associated with the first association information in a pull down window, such that the name of the first preset information in the pull down window, the one or more first setting items, and the one or more second setting items are concurrently displayed with the message indicating the setting values of the one or more second setting items are not permitted to change.

20. An information processing apparatus comprising:
a storage part that stores therein plural pieces of preset information including first preset information and second preset information;
an acquisition part that obtains, from a target file that is to be processed and includes first association information associated with the first preset information, the first association information; and
a display controller that displays, upon processing the target file, one or more pieces of preset information out of the stored plural pieces of preset information while preferentially displaying, based on the first association information obtained by the acquisition part, the first preset information associated with the first association information over the second preset information, wherein
the first preset information comprises flag information which comprises one of a first value and a second value, and
the display controller is further configured:
upon processing another target file that does not include the first association information associated with the first preset information,
(i) to display one or more pieces of preset information out of the stored plural pieces of preset information with the first preset information being not included in the displayed one or more pieces of preset information, in a case where the flag information of the first preset information comprises the first value, and
(ii) to display one or more pieces of preset information out of the stored plural pieces of preset information with the first preset information being included in the displayed one or more pieces of preset information, in a case where the flag information of the first preset information comprises the second value.

* * * * *